(12) United States Patent
Tomioka

(10) Patent No.: US 8,009,596 B2
(45) Date of Patent: Aug. 30, 2011

(54) DATA TRANSMITTING APPARATUS, DATA RECEIVING APPARATUS, AND DATA COMMUNICATION SYSTEM

(75) Inventor: Tazuko Tomioka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1012 days.

(21) Appl. No.: 11/812,838

(22) Filed: Jun. 22, 2007

(65) Prior Publication Data

US 2008/0130534 A1    Jun. 5, 2008

(30) Foreign Application Priority Data

Nov. 30, 2006   (JP) .................................. 2006-324229

(51) Int. Cl.
*H04B 7/00* (2006.01)

(52) U.S. Cl. ......... 370/310; 370/329; 370/228; 370/236

(58) Field of Classification Search ................... 370/310, 370/329, 228, 236; 79/748; 709/748
See application file for complete search history.

(56) References Cited

U.S. PATENT DOCUMENTS

| | | | |
|---|---|---|---|
| 6,381,215 B1* | 4/2002 | Hamilton et al. | 370/236 |
| 6,757,255 B1* | 6/2004 | Aoki et al. | 370/252 |
| 2003/0131302 A1* | 7/2003 | Nobelen | 714/752 |
| 2005/0176371 A1* | 8/2005 | Palin et al. | 455/41.2 |
| 2005/0210355 A1* | 9/2005 | Itoh et al. | 714/748 |
| 2006/0089997 A1* | 4/2006 | Inokuchi | 709/228 |
| 2007/0016838 A1* | 1/2007 | Mielczarek et al. | 714/749 |
| 2007/0042733 A1* | 2/2007 | Tomioka | 455/179.1 |

FOREIGN PATENT DOCUMENTS

| | | |
|---|---|---|
| JP | 10-313294 | 11/1998 |
| JP | 11-252205 | 9/1999 |
| JP | 2001-007775 | 1/2001 |
| JP | 2002-374402 | 12/2002 |
| JP | 2003-078565 | 3/2003 |
| JP | 2004-236133 | 8/2004 |
| JP | 2005-269480 | 9/2005 |
| JP | 2006-126894 | 5/2006 |
| WO | WO 03/105420 A1 | 12/2003 |

OTHER PUBLICATIONS

Notice of Rejection mailed by the Japanese Patent Office on Nov. 25, 2008, in counterpart Japanese Application No. 2006-324229, and partial English translation thereof.

* cited by examiner

*Primary Examiner* — Kamran Afshar
*Assistant Examiner* — Shahriar Behnamian
(74) *Attorney, Agent, or Firm* — Finnegan, Henderson, Farabow, Garrett & Dunner, L.L.P.

(57) ABSTRACT

A data transmitting apparatus generates a block that includes identification information including the number of times divided data can be transmitted and data for error detection for detecting an error in the identification information associated with each other with respect to each divided data, and transmits the block to a data receiving apparatus. If the number of times divided data can be transmitted is one or more, the data transmitting apparatus stores the corresponding block in a transmission memory, and retransmits it upon a request for retransmission from the data receiving apparatus.

11 Claims, 14 Drawing Sheets

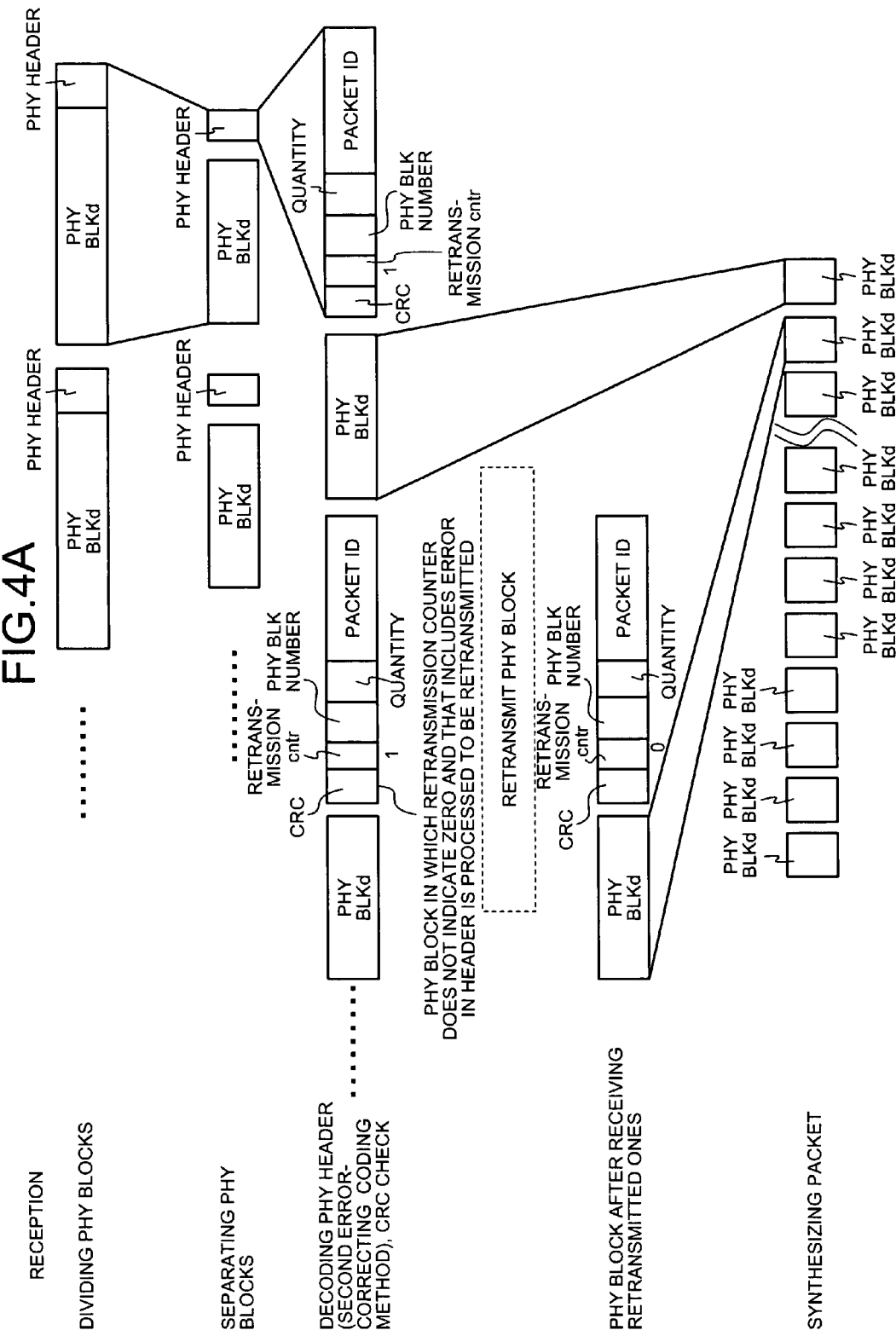

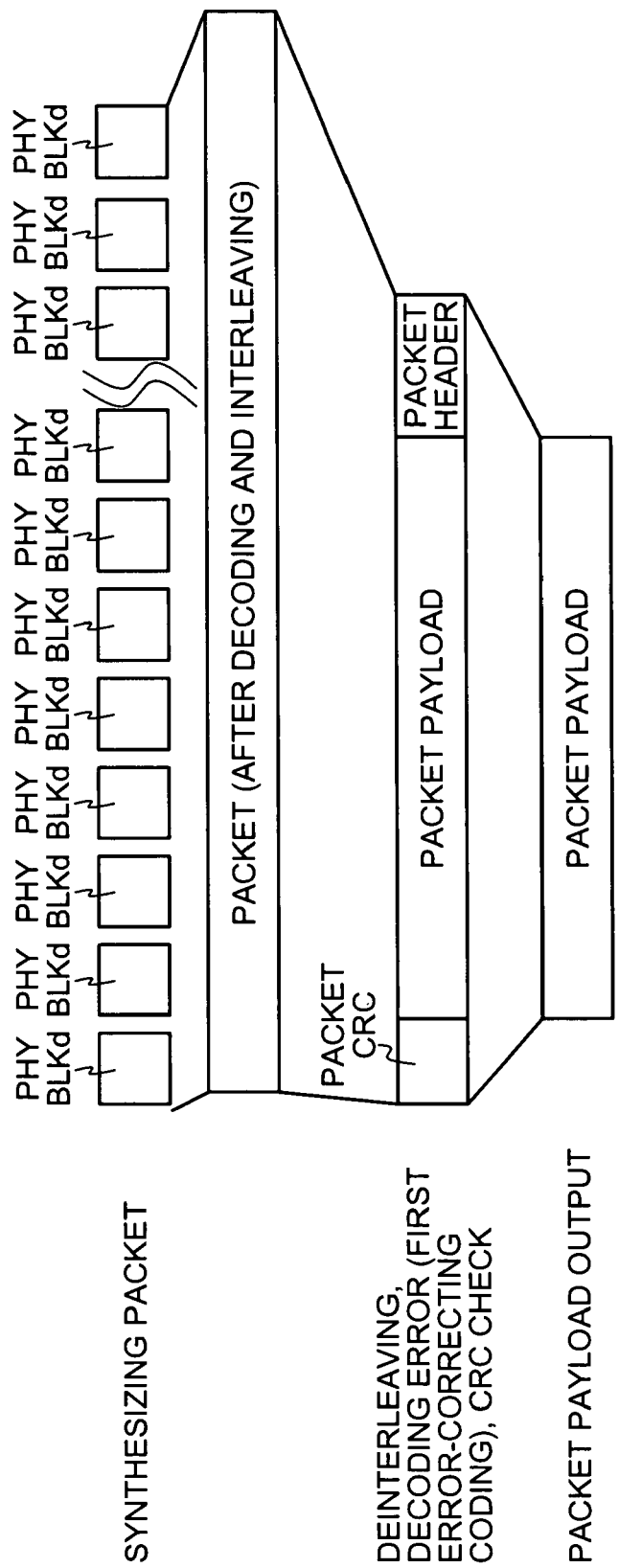

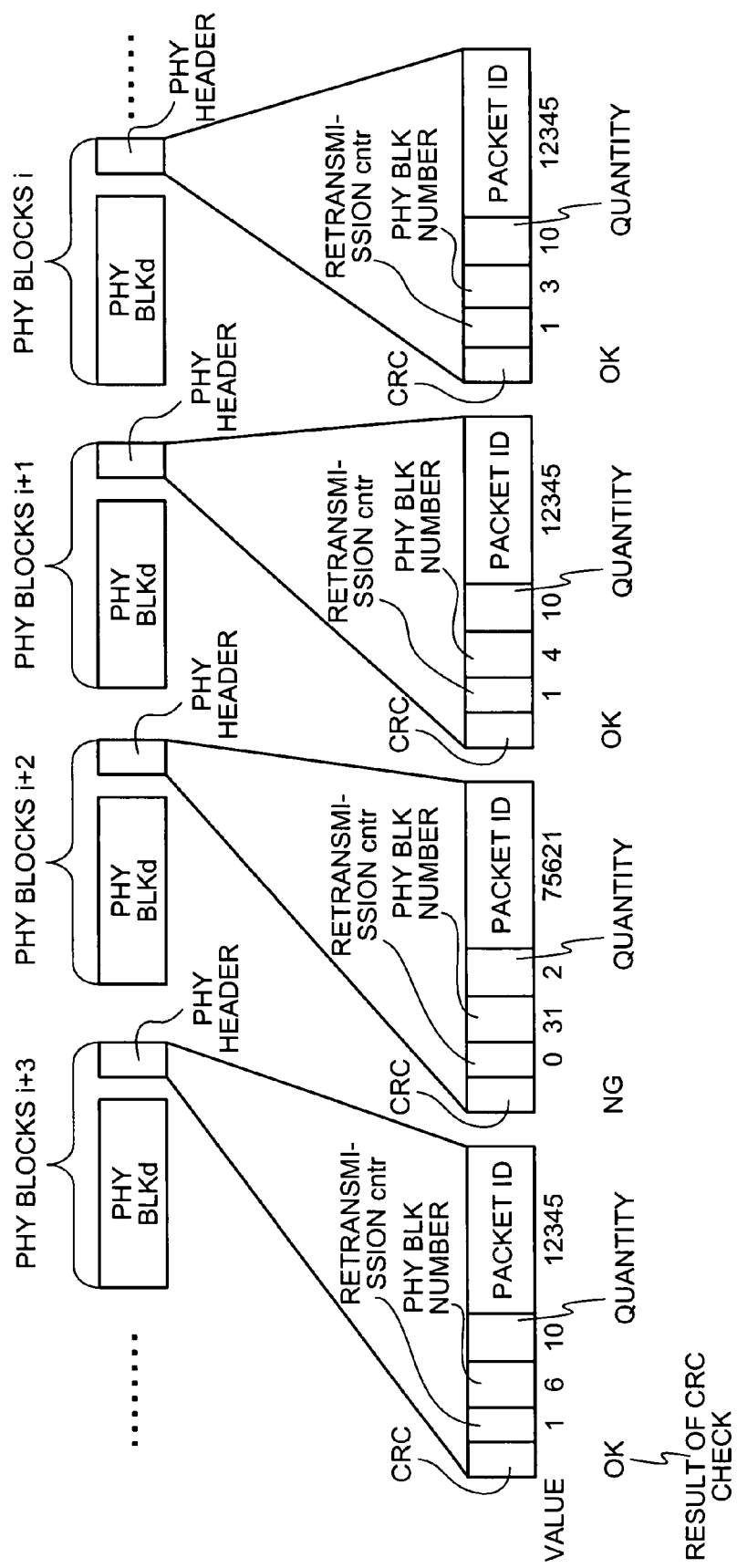

DATA TRANSMITTING APPARATUS, DATA RECEIVING APPARATUS, AND DATA COMMUNICATION SYSTEM

CROSS-REFERENCE TO RELATED APPLICATIONS

This application is based upon and claims the benefit of priority from the prior Japanese Patent Application No. 2006-324229, filed on Nov. 30, 2006; the entire contents of which are incorporated herein by reference.

BACKGROUND OF THE INVENTION

1. Field of the Invention

The present invention generally relates to a data transmitting apparatus, a data receiving apparatus, and a data communication system.

2. Description of the Related Art

An increasing number of methods have been used to realize communication in familiar surroundings along with the development of the information society, and the communication speed has remarkably increased. To further increase the communication speed, an acceptable use policy is set for a new medium. In most types of existing wireless communication, a regulation requires that a certain bandwidth should be used only for a predetermined application. However, some of the bandwidths can be used for a plurality of applications. Furthermore, very wide bands laid over plurality of other applications' bands are determined to be opened for Ultra Wideband (UWB) communication, with a condition of limiting use for low-power short-range communication. In this case, however, a wireless communication for an application has a possibility of interfering with a wireless communication for another application.

The regulation for the UWB obliges that, if a system licensed to use a frequency is not very resistant to interference waves, UWB systems should stop transmission when it detects a radio wave from the licensed system. This technology is referred to as a Detect And Avoid (DAA). A concept of the DAA is understood to be covered by a concept of cognitive wireless communication. The cognitive wireless communication is a technology of performing sensing, recognizing, and getting adapted for an environment when communicating. If the object to be recognized is the use of frequencies nearby and the adaptation condition is to stop the transmission upon detecting the transmission from the licensed system, the definition of cognitive radio is equivalent to the DAA. Although this technology is necessary to protect the licensed system, a sudden transmission stoppage affects communication performance of the UWB and the cognitive system.

If only a part of a packet is not transmitted due to the transmission stoppage, the data can be recovered by error correction and retransmission control that most of wireless communication systems have the functions. However, the retransmission uses a bandwidth for a normal traffic, which reduces throughput. Therefore, various technologies have been proposed to reduce the amount of the retransmission in a system that performs both of the error correction and the retransmission control.

For example, JP-A 2005-269480 (KOKAI) discloses a technology used by a system that transmits transmission data, in which frame data to be transmitted are coded with an outer error-correcting code, divided into a predetermined number of blocks, and coded with an inner error-correcting code. The technology is to determine whether to perform the retransmission based on likelihood after decoding received transmission data with the inner code. The system requests the retransmission block by block if a frame is estimated to include so many errors according to the inner code that cannot be corrected by the outer code, whereby increasing transmission efficiency.

However, according to the technology disclosed in JP-A 2005-269480 (KOKAI), because relation between each of the divided blocks and the frame is not known at the time of decoding the inner code, the system may request the retransmission of the block of the frame that is not allowed to be retransmitted. As a result, the transmission efficiency can be reduced.

Moreover, according to an aspect of the cognitive communication and the DAA, the system stops the transmission at the frequency immediately after the detection of the transmission from the licensed system. Therefore, the errors burst in a different manner from the errors caused by fad. In such a case, the amount of the retransmission can be reduced by retransmitting only the bursting errors; however, the technology disclosed in JP-A 2005-269480 (KOKAI) also retransmits blocks with non-burst errors such as errored block due to fading, resulting in reduced transmission efficiency.

SUMMARY OF THE INVENTION

According to one aspect of the present invention, a data transmitting apparatus includes a first encoding unit that encodes a packet to be transmitted based on a first error-correcting method and generates an encoded packet; a dividing unit that divides the encoded packet and generates a plurality of divided data; an identification-information generating unit that generates identification information unique to one of the divided data; a computing unit that computes data for error detection in the identification information; a second encoding unit that encodes the identification information and the data for error detection based on a second error-correcting method and generates additional information; a block generating unit that adds the additional information to the one of the divided data and generates a block; a transmission-data storing unit that stores the block; a transmitting unit that transmits the block; a receiving unit that receives retransmission requesting information for requesting retransmission of the block from an external device, when the external device having received the block detects an error in the block based on the data for error detection; and a retransmission control unit that reads the block from the transmission-data storing unit and instructs the transmitting unit to transmit the block when the receiving unit receives the retransmission requesting information.

According to another aspect of the present invention, a data receiving apparatus includes a receiving unit that receives each of a plurality of divided data that form a single encoded packet encoded based on a first error-correcting method from an external device in units of blocks, a block including a single divided data and additional information added thereto, the additional information including identification information unique to one of the divided data and data for error detection both of which are encoded based on a second error-correcting method; a separating unit that separates each of the blocks into the divided data and the additional information; a first decoding unit that performs error-correction decoding on the additional information and acquires the identification information and the data for error detection; an error detecting unit that detects an error in the identification information based on the data for error detection; a retransmission processing unit that generates requesting information for requesting retransmission of the block that includes the error detected by the error detecting unit in the identification information; a transmitting unit that transmits the retransmission requesting information to an external device; a packet synthesizing unit that synthesizes the encoded packet based on the divided data contained in the block retransmitted from the external device and other block data received in advance; and a second decoding unit that performs error-correction decoding on the encoded packet and generates a single packet.

According to still another aspect of the present invention, a data communication system includes a data transmitting apparatus; and a data receiving apparatus, wherein the data transmitting apparatus includes: a first encoding unit that encodes a packet to be transmitted based on a first error-correcting method and generates an encoded packet; a dividing unit that divides the encoded packet and generates a plurality of divided data; an identification-information generating unit that generates identification information unique to one of the divided data; a computing unit that computes data for error detection in the identification information; a second encoding unit that encodes the identification information and the data for error detection based on a second error-correcting method and generates additional information; a block generating unit that adds the additional information to the one of the divided data and generates a block; a transmission-data storing unit that stores the block; a transmitting unit that transmits the block; a receiving unit that receives retransmission requesting information for requesting retransmission of the block from an external device when the external device having received the block detects an error in the block based on the data for error detection; and a retransmission control unit that reads the block from the transmission-data storing unit and instructs the transmitting unit to transmit the block when the receiving unit receives the retransmission requesting information, and the data receiving apparatus includes: a receiving unit that receives the block from the data transmitting apparatus; a separating unit that separates each of the blocks into the divided data and the additional information; a first decoding unit that performs error-correction decoding on the additional information and acquires the identification information and the data for error detection; an error detecting unit that detects an error in the identification information based on the data for error detection; a retransmission processing unit that generates requesting information for requesting retransmission of the block that includes the error detected by the error detecting unit in the identification information; a transmitting unit that transmits the retransmission requesting information to an external device; a packet synthesizing unit that synthesizes the encoded packet based on the divided data contained in the block retransmitted from the data transmitting apparatus and other block data received in advance; and a second decoding unit that performs error-correction decoding on the encoded packet and generates a single packet.

BRIEF DESCRIPTION OF THE DRAWINGS

FIGS. 4A and 4B are schematic views of operations of the data receiver;

FIGS. 5 and 6 are schematic views of operations in a transmission and retransmission processes, respectively;

DETAILED DESCRIPTION OF THE INVENTION

Exemplary embodiments of the present invention are explained below in detail referring to the accompanying drawings. In the accompanying drawings, only units that directly related to the embodiments are shown. Explanation is omitted for units that do not affect the embodiments, even if they are requisite for realizing a wireless device.

A data communication system according to a first embodiment is explained below. The data communication system includes a data transmitter 10 as a data transmitting apparatus and a data receiver 20 as a data receiving apparatus.

Figure 1:
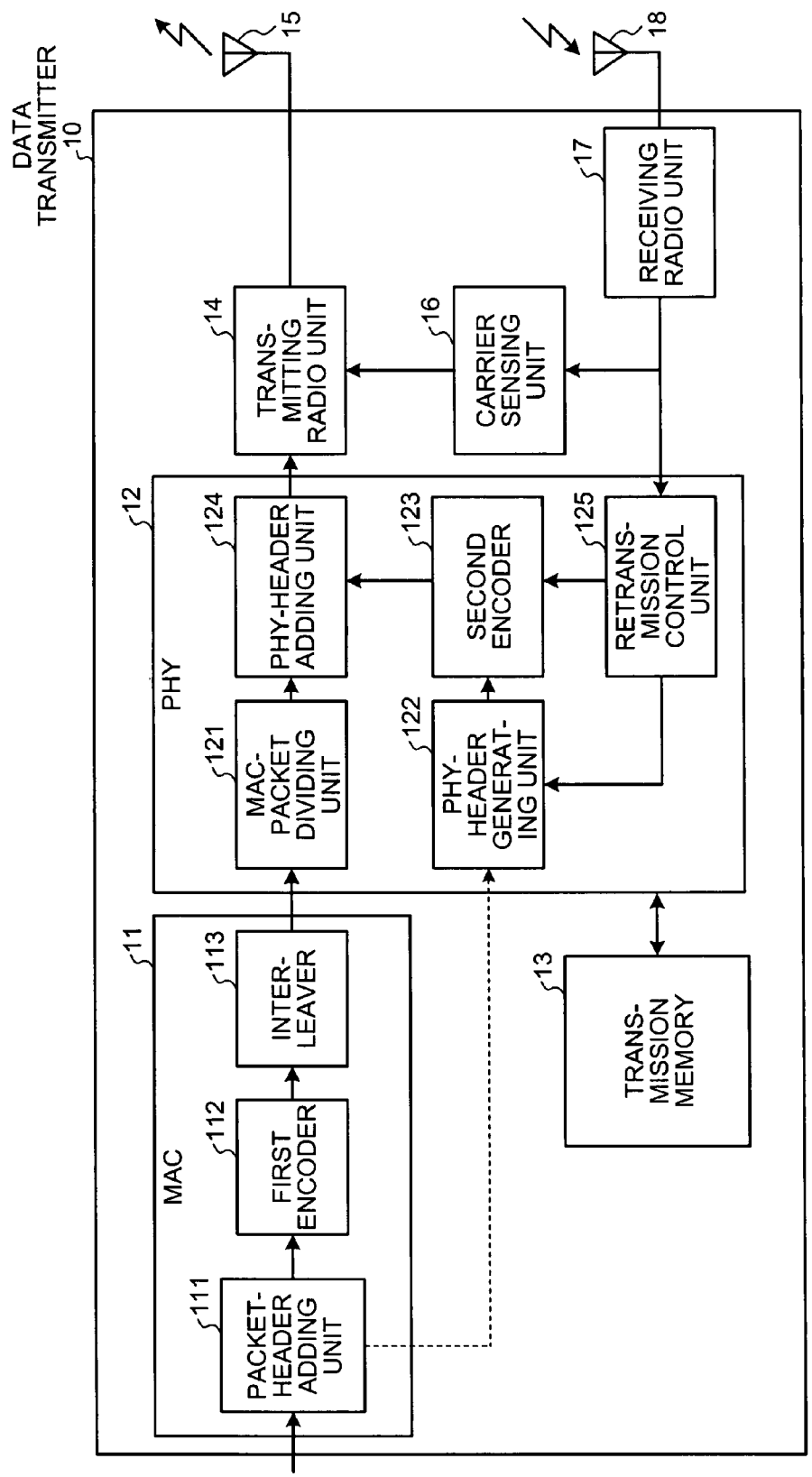
FIG. 1 is a block diagram of a data transmitter according to first embodiment of the present invention.
Figure 2:
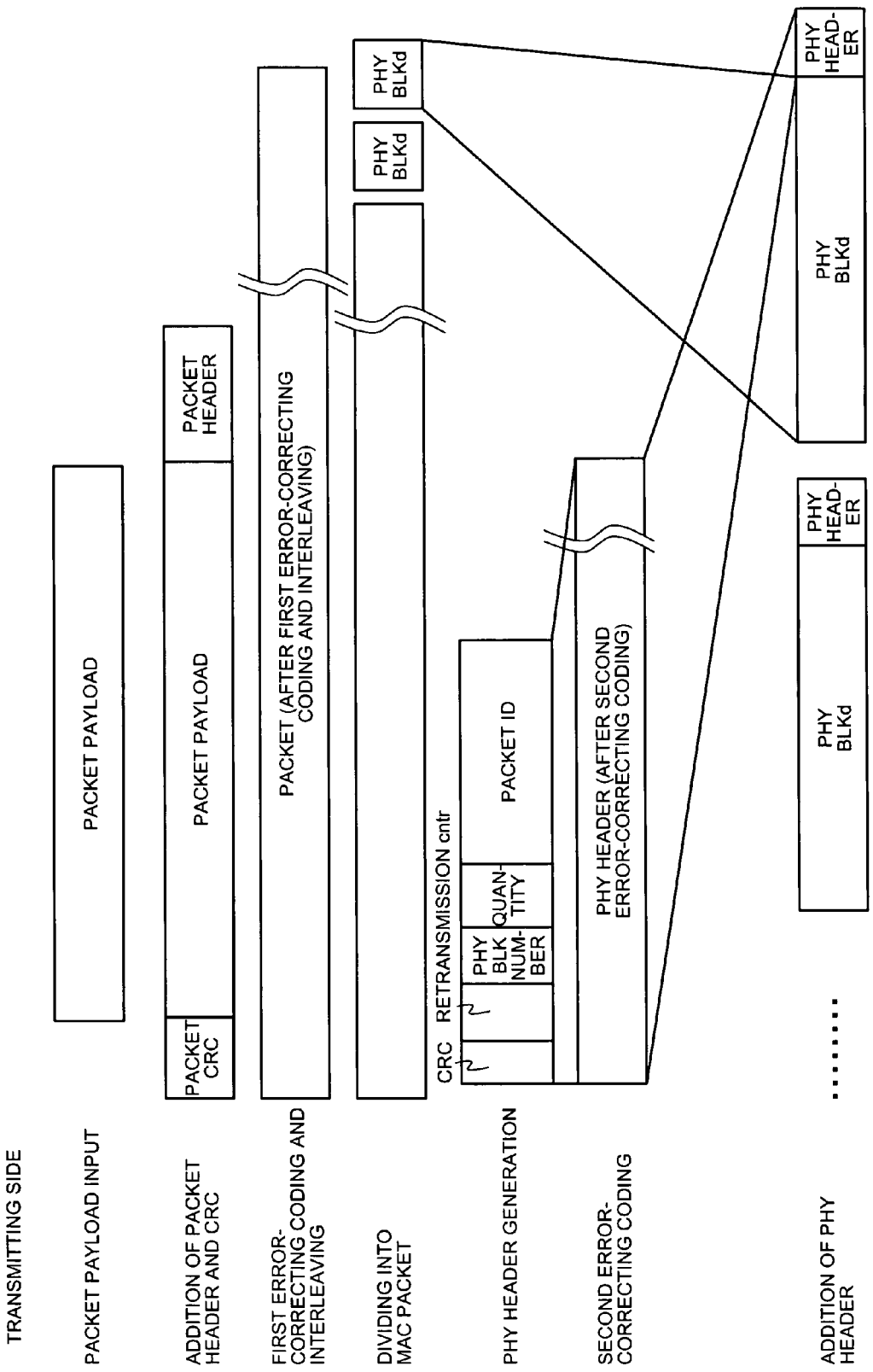
FIG. 2 is a schematic view of an operation of the data transmitter.

FIG. 1 is a block diagram of the data transmitter 10. FIG. 2 is a schematic view of operations performed by the data transmitter 10.

The data transmitter 10 includes a MAC 11 that performs a process in a media access control (MAC) layer, a PHY 12 that performs a process in a physical (PHY) layer, a transmission memory 13, a transmitting radio unit 14, a transmission antenna 15, a carrier sensing unit 16, a receiving radio unit 17, and a reception antenna 18. In the data transmitter 10 according to the first embodiment, data to be transmitted is formed into a packet payload in a data link layer by a data forming unit (not shown), and then the formed data is output to a packet-header adding unit 111 to be described later.

The MAC 11 includes the packet-header adding unit 111, a first encoder 112, and an interleaver 113.

The packet-header adding unit 111 adds a unique packet header to a payload input to the MAC 11. It is assumed that the packet header includes information according to the nature of the packet payload sent from an upper-layer processing unit (not shown).

Moreover, the packet-header adding unit 111 computes a cyclic redundancy check (CRC) code on the entire packet and adds the CRC to the packet payload, whereby generating a MAC packet. The CRC is an error-detecting code used to detect errors in the entire packet including the packet header. Although the CRC is used as the error-detecting code in the first embodiment, other error-detecting codes can be used unless the error detectability is impaired. If an encoding method that can simultaneously detect errors is used as an error-correction coding, it is not necessary to add the error-detecting code at this point. Instead, the error-correcting coding can include functions of error correction and error detection. The same alternative applies to a PHY block header to be described later. In such a case, the receiver performs the error correction and the error detection on the same module at the same time.

The first encoder 112 performs the error-correction coding on the entire MAC packet generated by the packet-header adding unit 111 based on a first error-correction coding method using a predetermined first coding rate, and outputs the resulting packet to the interleaver 113. The first error-correction coding method and the first coding rate will be explained in detail along with a second error-correction coding method and a second coding rate.

The interleaver 113 interleaves the MAC packets on which the first error-correction coding was performed with respect to each MAC packet, and outputs the resulting MAC packets to the PHY 12.

The PHY 12 includes a MAC-packet dividing unit 121, a PHY-header generating unit 122, a second encoder 123, a PHY-header adding unit 124, and a retransmission control unit 125.

The MAC-packet dividing unit 121 divides the interleaved MAC packet in units of PHY block data (PHY BLKd), and stores each PHY block in the transmission memory 13. The size of the PHY block data needs to be sufficiently smaller than that of the error-corrected MAC packet. For example, if the size of the MAC packet added with the CRC and the packet header is between 82 bytes and 1518 bytes equivalent to that of Ethernet (registered trademark) and the error- is performed on the MAC packet with the coding rate of ½, the size is roughly between 1,300 bits and 24,300 bits. On the other hand, if the size of the PHY block data is about 450 bits, a single MAC packet is divided into three to tens of PHY block data.

When the MAC-packet dividing unit 121 divides the MAC packet, the PHY-header generating unit 122 generates PHY headers for PHY block data, associates the PHY headers with the corresponding PHY block data, and stores them in the transmission memory 13.

As shown in FIG. 2, the PHY header generated by the PHY-header generating unit 122 includes identification information, a CRC for detecting errors in the identification information, and the like.

The identification information includes information unique to the PHY block data, and it is used when the MAC packet is synthesized from the PHY block data, when the PHY block data to be retransmitted is identified, and when the retransmitted PHY block data is combined with already-received PHY block data to synthesize the MAC packet.

More specifically, the identification information includes a packet identification (packet ID), a quantity, and a PHY BLK number. The packet ID is used to identify a MAC packet to which the PHY block data belongs. The quantity indicates how many PHY blocks that belong to a single MAC packet are transmitted at once, i.e., total number of the PHY blocks that configure the MAC packet at the first transmission. The PHY BLK number indicates the nth number of the PHY block data among all PHY block data in a single MAC packet. It is desirable to assign serial numbers as the PHY BLK numbers according to the order of configuring the MAC packet so that a PHY block that includes an error in the PHY header can be estimated in the data receiver 20 to be described later.

The identification information further includes a retransmission counter that indicates the number of times the corresponding MAC packet can be retransmitted in units of PHY blocks. Any bit configuration can be used for the retransmission counter as long as the count of possible retransmission can be identified. According to the first embodiment, the remaining count of the possible retransmission is numerically indicated by the retransmission counter. For example, if the retransmission counter indicates one, it means that the PHY block belonging to the MAC packet can be retransmitted once. If the retransmission counter indicates zero, it means that the PHY block cannot be retransmitted any more. The PHY-header generating unit 122 is configured to set a common value as an initial value of the retransmission counter for a plurality of PHY blocks that belong to an identical packet. According to the first embodiment, the retransmission counter is decremented by one every time the PHY blocks belonging to the MAC packet are retransmitted at a time.

If the PHY block is retransmitted frequently, the process to be performed in the PHY layer is stuck up, which may stop processes to be performed in a higher layer. If the data communication system is designed to guarantee a certain level of throughput, it is unlikely that a sudden transmission stoppage occurs frequently in a short time. In other words, if some of the PHY blocks belonging to a single MAC packet do not reach the data receiver 20 due to the transmission stoppage, it is very unlikely that PHY blocks retransmitted after the stoppage are involved in another transmission stoppage and do not reach the data receiver 20. The initial value of the retransmission counter is desired to be as small as possible. According to the first embodiment, the initial value of the retransmission counter is no more than one, i.e., the retransmission in units of PHY blocks can be performed only one time. By doing so, though fine control of the retransmission in units of PHY blocks taking into account quality of service is not possible without interpreting contents or background of the data, delay time due to the retransmission in units of PHY blocks is reduced, and the process in the higher layer is not interfered.

Moreover, the initial value of the retransmission counter is desired to be determined based on characteristics of the MAC packet to be transmitted. For example, if the delay of information to be transmitted is strictly limited and data delayed due to the retransmission cannot be used, the initial value of the retransmission counter can be set to zero. It is needless to say that, with the initial value zero, the retransmission in units of PHY blocks is not performed even if the transmission stops while a group of the PHY blocks belonging to a MAC packet are being transmitted.

The initial value of the retransmission counter is, as shown in FIG. 1, set by the PHY-header generating unit 122 based on header information that includes possibility of retransmission, degree of the delay, acceptable delay due to retransmission, and the like, as input from the packet-header adding unit 111. The packet-header adding unit 111 is configured to determine the above-described information by linking with the higher layer.

The CRC in the PHY header is error detection data used to detect errors of the identification information in the PHY header. The PHY-header generating unit 122 generates the identification information with respect to each PHY block data based on the information acquired from the packet-header adding unit 111, computes the CRC of the identification information, and stores a pair of the identification information and the CRC in the transmission memory 13 as the PHY header associated with the corresponding PHY block data.

The second encoder 123 generates an encoded PHY header by performing the error-correction coding on the PHY header based on the second error-correction coding method using a predetermined second coding rate, associates the encoded PHY header with the corresponding PHY block data, and stores a pair of the encoded PHY header and the PHY block data in which the retransmission counter does not indicate zero in the transmission memory 13.

The PHY-header adding unit 124 generates the PHY block by adding the encoded PHY header to the top of the corresponding PHY block data, and outputs the PHY block data with the encoded PHY header to the transmitting radio unit 14.

The PHY-header adding unit 124 outputs a plurality of PHY blocks belonging to the identical MAC packet to the transmitting radio unit 14 in accordance with the PHY BLK number (for example, in one of ascending order and descending order of the PHY BLK number). In other words, the PHY-header adding unit 124 refers to the PHY headers in the transmission memory 13, adds an encoded PHY header including an identical packet ID to the corresponding PHY block data in the order of the PHY BLK number, and outputs them to the transmitting radio unit 14 as a PHY block.

By controlling the transmission as described above, two rules in transmitting the PHY block are complied. A first rule is to transmit a plurality of PHY blocks in a single MAC packet at a time. In other words, the PHY headers in the identical MAC packet are transmitted (retransmitted) continuously without transmitting (retransmitting) PHY blocks in another MAC packet. Transmission of control PHY blocks which are used to transfer control information is an exception and they can be transmitted during the transmission of series of PHY blocks of a MAC packet; however, it is desirable that the control block is not very frequently inserted and that the control block is not continuously inserted to a single MAC packet. If the control block is to be continuously transmitted, it is preferably inserted between MAC packets.

A second rule is to transmit a plurality of PHY blocks in a single MAC packet in the order (in ascending order or descending order) of the PHY BLK number. In the case of retransmission, the PHY BLK numbers may be discontinuous. Even if the PHY BLK numbers are discontinuous, the PHY blocks are transmitted in the order of the PHY BLK number. The two rules are used to estimate the header information and other information on the background of the PHY block if an error is detected in the PHY block.

When the retransmission control unit 125 detects that the receiving radio unit 17 received retransmission requesting information that instructs retransmission of a PHY block, the retransmission control unit 125 decrements the value of the retransmission counter in the PHY header of the PHY block to be retransmitted by one. The retransmission control unit 125 controls the PHY-header generating unit 122 to compute the CRC of the updated PHY header, and controls the second encoder 123 to perform the error-correction coding on the PHY header.

Moreover, the retransmission control unit 125 controls the PHY-header adding unit 124 to add the encoded PHY header stored in the transmission memory 13 so as to be retransmitted to the top of the PHY block data corresponding to the encoded PHY header, whereby generating the PHY block to be retransmitted and output to the transmitting radio unit 14. If the retransmission counter indicates zero at the time of the retransmission, the PHY-header adding unit 124 deletes the PHY block data, the PHY header, and the encoded PHY header of the PHY block from the transmission memory 13 after they are output to the transmitting radio unit 14.

Furthermore, the retransmission control unit 125 receives one of an acknowledgement (Ack) and a negative acknowledgement (Nack) to the PHY 12 transmitted from the data receiver 20 via the receiving radio unit 17, and performs a predetermined process. In a piggyback configuration to be described later, when the retransmission control unit 125 receives one of an Ack and a Nack to the MAC 11 transmitted from the data receiver 20 via the receiving radio unit 17, the retransmission control unit 125 outputs the Ack or the Nack to the MAC 11. Details of the PHY 12, the predetermined process, the piggyback configuration, and the MAC 11 will be explained later.

The transmission memory 13 includes a recording medium including a semiconductor memory, and stores therein various data on generation of PHY blocks and various data on PHY blocks to be retransmitted. The transmission memory 13 includes one of a magnetic recording medium, an optical recording medium, and a non-volatile recording medium including a semiconductor memory, and stores therein a program required to operate the data transmitter 10 and data used to execute the program.

The transmitting radio unit 14 is a radio transmitter compliant with a predetermined wireless method such as cognitive radio. The transmitting radio unit 14 converts the input PHY block into an appropriate form of radio signals and transmits the converted PHY block to an external device such as the data receiver 20 via the transmission antenna 15.

Moreover, the transmitting radio unit 14 notifies the data receiver 20 in advance of frequency band and time slot of the radio signal transmitted by the data transmitter 10 using a predetermined control channel. The control channel can be a fixed channel with the frequency and the bandwidth are fixed and predetermined in advance or variable channel if the data receiver 20 is made possible to receive the signals by performing any negotiation process.

The carrier sensing unit 16 performs a carrier sense on the frequency band that the radio signals from the transmitting radio unit 14 can use, based on a radio wave acquired via the reception antenna 18 and the receiving radio unit 17. If the carrier sensing unit 16 detects a transmission signal from a licensed terminal or an interference wave at an unacceptable level, the carrier sensing unit 16 stops transmission from the transmitting radio unit 14 in the frequency band in the next time slot.

The receiving radio unit 17 receives various information transmitted from an external device such as the data receiver 20 via the reception antenna 18. According to the first embodiment, the receiving radio unit 17 receives the Ack, the Nack, and the like transmitted from the data receiver 20 according to the transmission of the MAC packet, i.e., the PHY blocks. Hereinafter, to notify a transmitter that the MAC packet has been properly received or that all of the PHY blocks in the MAC packet transmitted at the time have been properly received is expressed as "to return an Ack", and to notify that a part or all of the transmitted data has not been received is expressed as "to return a Nack". The Nack is basically a request for retransmission.

Figure 3:
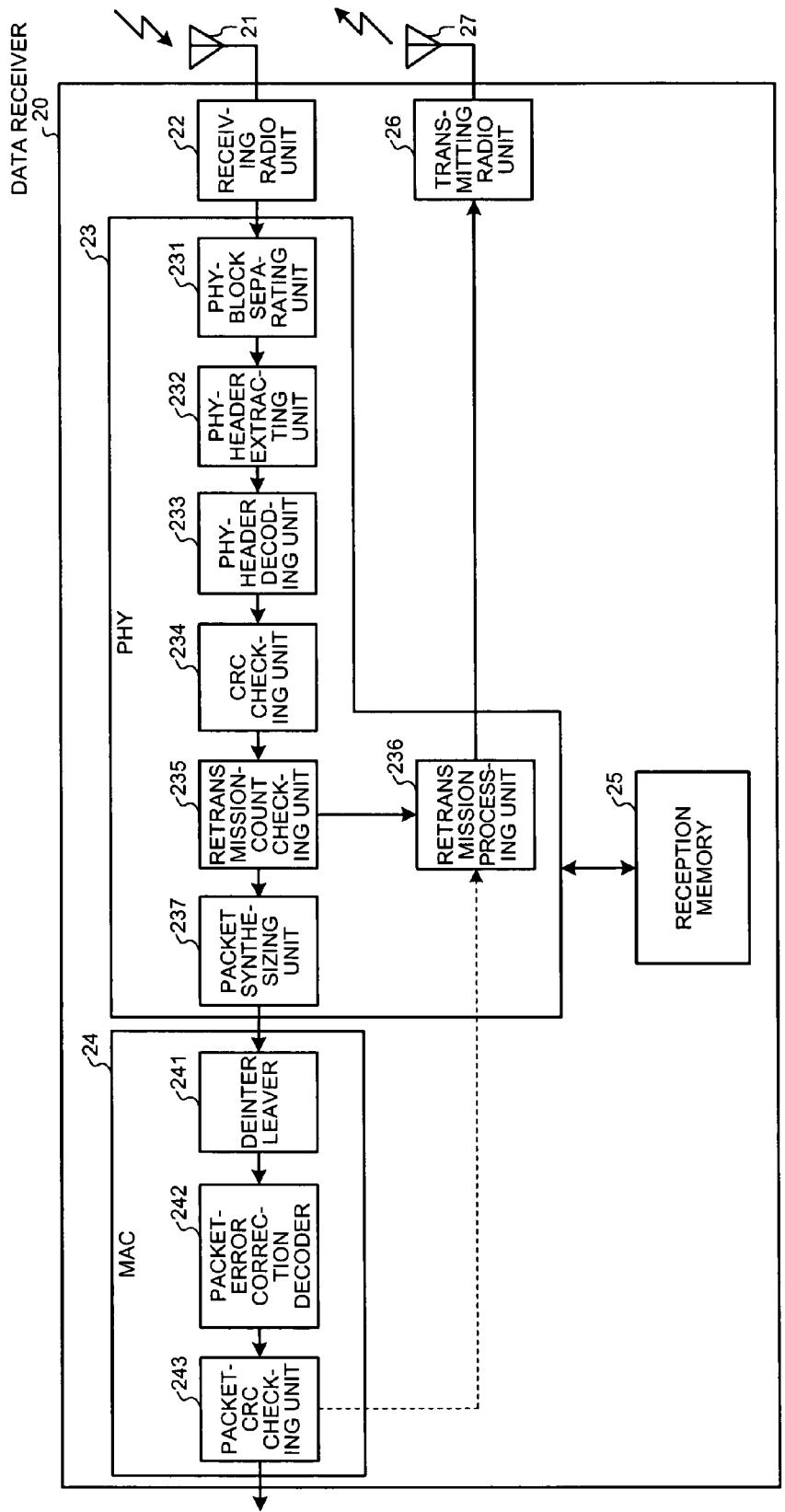
FIG. 3 is a block diagram of a data receiver according to the first embodiment.

FIG. 3 is a block diagram of the data receiver 20. FIGS. 4A and 4B are schematic views of operations performed by the data receiver 20.

As shown in FIG. 3, the data receiver 20 includes a reception antenna 21, a receiving radio unit 22, a PHY 23 that performs a process corresponding to the PHY layer, a MAC 24 that performs a process corresponding to the MAC layer, a reception memory 25, a transmitting radio unit 26, and a transmission antenna 27.

The receiving radio unit 22 is a wireless receiver compliant with the wireless method used by the transmitting radio unit 14 in the data transmitter 10. The receiving radio unit 22 demodulates the radio signal received via the reception antenna 21, and outputs it to the PHY 23.

The PHY 23 includes a PHY-block separating unit 231, a PHY-header extracting unit 232, a PHY-header decoding unit 233, a CRC checking unit 234, a retransmission-count checking unit 235, a retransmission processing unit 236, and a packet synthesizing unit 237.

The PHY-block separating unit 231 detects boundaries of PHY blocks in the demodulated radio signal, and separates the PHY blocks.

The PHY-header extracting unit 232 extracts the encoded PHY header from each of the separated PHY blocks, and outputs the encoded PHY header to the PHY-header decoding unit 233.

The PHY-header decoding unit 233 performs an error-correcting decoding on the encoded PHY header based on a decoding method corresponding to the second error-correction coding method, and outputs the decoded PHY header to the CRC checking unit 234.

The CRC checking unit 234 performs a CRC check on the PHY header based on the CRC included in the PHY header, and outputs the result of the CRC check to the retransmission-count checking unit 235 along with the checked PHY header and the PHY block data corresponding to the PHY header.

The retransmission-count checking unit 235 lets the reception memory 25 store PHY block data in association with the corresponding PHY headers, whose PHY headers have passed the CRC check, and have the identical packet ID. The retransmission-count checking unit 235 is configured to let the reception memory 25 store the PHY block data in one of ascending order and descending order of the PHY BLK number included in each of the PHY headers. When the PHY block data is stored, to determine whether the received PHY block was transmitted for the first time, the retransmission-count checking unit 235 refers to the reception memory 25 and determines whether it stores therein any PHY block with the identical packet ID.

Moreover, the retransmission-count checking unit 235 counts the quantity of the received PHY blocks that passed the CRC check, and combines it with the quantity of the PHY block data stored in the reception memory 25. By doing so, the retransmission-count checking unit 235 determines whether all of the PHY block data in a single MAC packet are stored in the reception memory 25. If all of the PHY block data in a single MAC packet are stored, the retransmission-count checking unit 235 passes the processing role on the PHY block data in the reception memory 25 over to the packet synthesizing unit 237.

If not all of the PHY block data in a single MAC packet are stored, the retransmission-count checking unit 235 refers to the value of the retransmission counter in the received PHY header that passed the CRC check. If the retransmission counter indicates one or more, the retransmission-count checking unit 235 reads the PHY BLK number of the PHY block with the PHY header that passed the CRC check, estimates the PHY BLK numbers of the failed PHY blocks, and outputs the PHY BLK numbers of failed PHY blocks to the retransmission processing unit 236 or stores it in the reception memory 25. The method of determining the PHY BLK number to be retransmitted will be explained later.

Furthermore, even if the PHY block data is transmitted for the first time, the retransmission-count checking unit 235 does not extract the PHY BLK number to be retransmitted from a group of PHY block data that has zero in the retransmission counter, and passes the processing role on the CRC-passed PHY block data in the reception memory 25 over to the packet synthesizing unit 237. The PHY block data that is not received correctly at this time, i.e., the PHY block data corresponding to the PHY header that failed the CRC check, can be handled in some ways.

For example, the PHY block data that is not correctly received can be vacant so as not to be passed to the next stage, and the packet synthesizing unit 237 can be configured to reconstruct the MAC packet of only the received PHY block data. However, improperly received PHY block data sometimes includes a part of the PHY block data. Therefore, the retransmission-count checking unit 235 can be configured to store the PHY block data corresponding to the CRC-failed PHY header in the reception memory 25 like the PHY block data corresponding to the CRC-passed PHY header and pass it over to the packet synthesizing unit 237.

If the cause of the PHY header failing the CRC can be estimated measuring some parameters such as a received signal strength indicator (RSSI) and an error vector magnitude (EVM), the retransmission-count checking unit 235 can be configured to change likelihood of the PHY block data corresponding to the CRC-failed PHY header according to the reliability of the PHY block data estimated from the measuring result and pass the process over to the packet synthesizing unit 237 along with the likelihood. In this configuration, the data receiver 20 can include a unit that measures the likelihood of the PHY block, or any one of the units shown in FIG. 3, such as the receiving radio unit 22, can include the function.

If the received PHY block is retransmitted, the retransmission-count checking unit 235 let the retransmitted PHY block data corresponding to the CRC-passed PHY header be stored in the reception memory 25 along with the PHY header. At this time, the retransmitted PHY block data is stored in the reception memory 25 in the order of the PHY BLK number along with already-stored PHY block data having the identical packet ID.

After the retransmitted PHY block data is stored in the reception memory 25, the retransmission-count checking unit 235 determines whether all of the PHY block data in a single MAC packet have been stored in the reception memory 25. If all of the PHY block data in a single MAC packet have been stored, the retransmission-count checking unit 235 passes the processing role on the PHY block data to the packet synthesizing unit 237.

The PHY header can fail the CRC check even though the PHY block data has been retransmitted. In such a case, if the retransmission counter in the PHY header is not estimated to indicate zero, the PHY BLK number of the PHY block is output to the retransmission processing unit 236 again. When the PHY block is retransmitted and CRC check is failed, the data receiver 20 can be configured either to store the PHY block data with the CRC-failed PHY header in the reception memory 25 or to discard it.

The PHY block with the retransmission counter updated to zero by the retransmission is processed in the same manner as when the retransmission counter indicates zero, which is described above. However, in the case of storing the CRC-failed PHY block in the reception memory 25, the data receiver 20 can be configured to select a CRC-failed PHY block with comparatively better characteristics from all of the received CRC-fail PHY blocks of identical PHY BLK number and pass it over to the packet synthesizing unit 237. Alternatively, the data receiver 20 can be configured to pass all of the CRC-failed PHY blocks over to the packet synthesizing unit 237 so as to be subjected to a process such as a maximum ratio combining. The quality of the PHY blocks can be determined based on the received power, which is measured by the receiving radio unit 22 for every PHY block.

As an exceptional process of the retransmission, the PHY block data that passed the CRC check in the past may be received again at the retransmission. In such a case, one of the PHY block data with the CRC-passed PHY header can be selected. Otherwise, if the reliability of each reception is measured by the RSSI, the EVM, or the like, a more reliable PHY block data can be selected from the PHY block data with the CRC-passed PHY headers, or the maximum ratio combining can be performed using the measurement results.

As described above, according to the first embodiment, because of the rule on the order of transmitting the PHY blocks, while a plurality of PHY blocks that belong to a single MAC packet are being transmitted, any PHY block that belongs to another MAC packet is not transmitted. Therefore, even if some of the PHY blocks are not received, it is not necessary to store PHY blocks that belong to a previous MAC packet in the reception memory 25 any more after a PHY block with a different packet ID is detected. In other words, a following process such as a reconstruction of the MAC packet or a retransmission can be started on the PHY block that belongs to a previous MAC packet at this time point.

Moreover, according to the first embodiment, because of the rule on the order of transmitting the PHY blocks, a plurality of PHY blocks that belong to a single MAC packet are transmitted in the order of the PHY BLK number and the transmitting order of PHY blocks cannot be switched. This is a necessary requirement when the data receiver 20 is configured to transfer the PHY block data corresponding to the CRC-failed PHY header to the packet synthesizing unit 237.

The retransmission processing unit 236 generates the retransmission requesting information (Nack-p to be described later) that requests retransmission of the PHY block corresponding to the PHY BLK number input from the retransmission-count checking unit 235 or the PHY BLK number to be retransmitted stored in the reception memory 25, and transmits it to the data transmitter 10 via the transmitting radio unit 26. The retransmission processing unit 236 generates the Ack of the received MAC packet or PHY block, and transmits it to the data transmitter 10 via the transmitting radio unit 26.

In the piggyback configuration described later, the retransmission processing unit 236 transmits one of the Ack and the Nack to the MAC 11 input from the MAC 24 to the data transmitter 10 via the transmitting radio unit 26.

The packet synthesizing unit 237 synthesizes the PHY block data having the identical packet ID in the reception memory 25 in the order of the PHY BLK number based on the instruction from the retransmission-count checking unit 235, and reconstructs a single MAC packet.

FIG. 5 is a schematic view of PHY blocks i to i+3 received by the data receiver 20 in the first transmission of the PHY blocks in a single MAC packet. It is assumed that PHY headers of all PHY blocks i to i+3 passed the CRC check except the PHY block i+2.

As shown in FIG. 5, the informations (e.g. packet ID and retransmission counter) in the PHY header in the CRC-failed PHY block i+2 are different from those in the previous PHY block i+1 and the following PHY block i+3, which seems to belong to another MAC packet. However, because it failed the CRC check, these values are not reliable. Therefore, the retransmission-count checking unit 235 estimates the informations of the PHY header in the PHY block i+2 from informations of the CRC-passed PHY headers.

For example, in FIG. 5, the retransmission-count checking unit 235 estimates from the informations of the PHY blocks i+1 and i+3 that the packet ID is 12345, the quantity is 10, and the value of the retransmission counter is one. Moreover, the retransmission-count checking unit 235 estimates that the PHY BLK number of the PHY header in the PHY block i+2 is 5 from the PHY BLK numbers 4 and 6 in the PHY headers of the PHY blocks i+1 and i+3, respectively.

If any PHY block is transmitted without compliance with the order of the PHY BLK number, it is difficult to identify the correct PHY BLK number for the PHY block with the CRC-failed PHY header. However, according to the first embodiment, because of the rule on the order of transmitting the PHY blocks, a plurality of PHY blocks that belong to the identical MAC packet are transmitted in the order of the PHY BLK number and the transmitting order of PHY blocks cannot be switched. Therefore, the informations of the CRC-failed PHY header can be estimated from the informations of adjacent CRC-passed PHY headers. As a result, consistency of the PHY blocks is maintained, and the received PHY blocks are effectively used.

Figure 6:
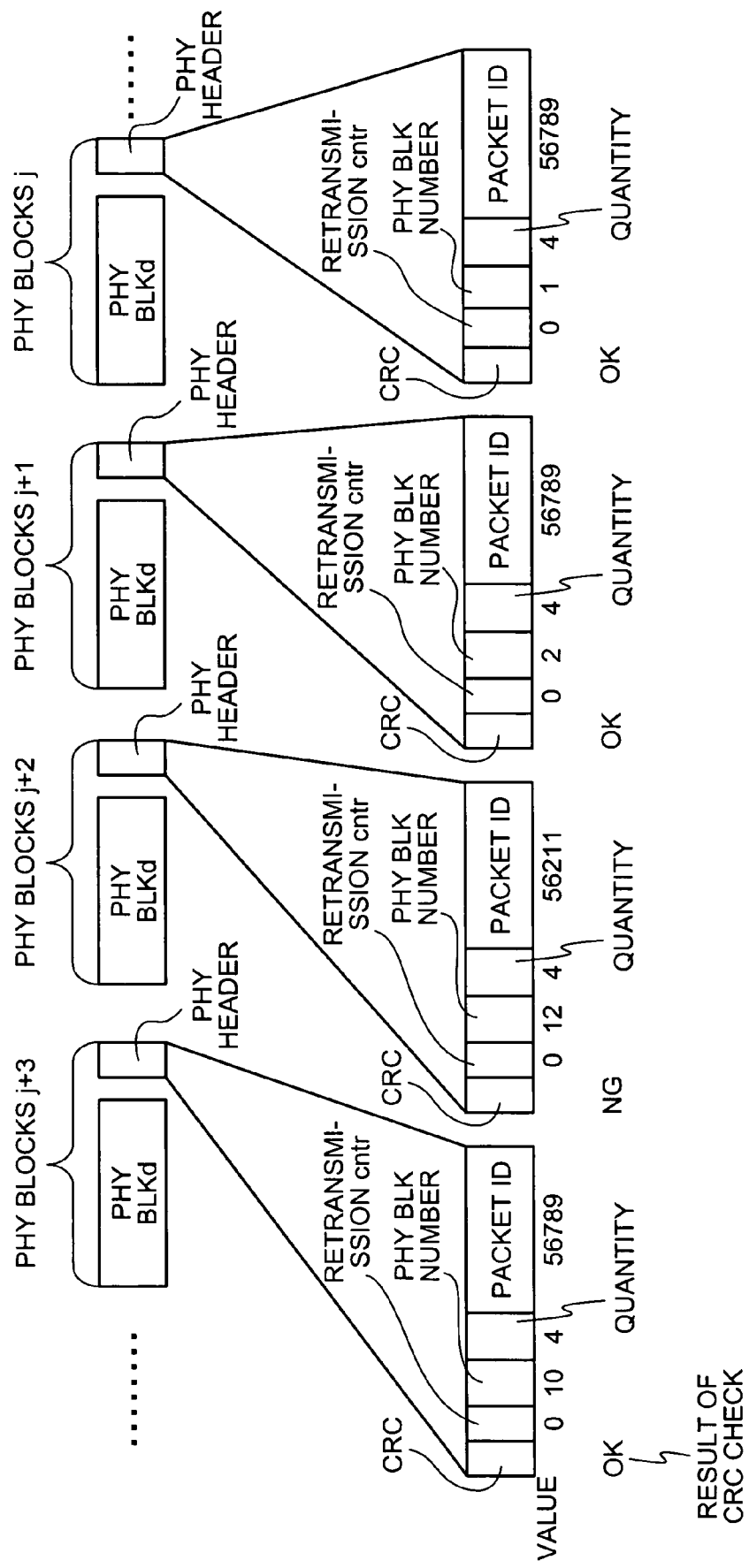

FIG. 6 is a schematic view of PHY blocks j to j+3, when they are retransmitted and the PHY block j+2 fails the CRC. It is assumed that a MAC packet with the packet ID 56789 includes 16 PHY blocks and that four of them are processed to be retransmitted after the first transmission, the PHY BLK numbers of which are 1, 2, 7, and 10.

As shown in FIG. 6, even if the PHY block j+2 fails the CRC check, a plurality of PHY blocks that belong to the identical MAC packet are transmitted in the order of the PHY BLK number, i.e., in the order of 1, 2, 7, and 10. Therefore, by comparing with the order of the PHY BLK numbers to be retransmitted, it can be assumed that the packet ID of the CRC-failed PHY block j+2 is 56789 and that the PHY BLK number is 7.

If the PHY header failed the CRC check due to the stoppage of the transmission from the data transmitter 10, the major components of the received PHY block data are noises and interference signals, and therefore, passing the PHY block data to the packet synthesizing unit 237 and synthesizing them with other correctly received PHY block data are useless. On the other hand, if it failed the CRC check due to fading or overlap of the interference signals, it includes some of the correct PHY block data information, and therefore the PHY block can be taken advantage of when they are passed to the packet synthesizing unit 237. Therefore, If data receiver 20 is composed to pass the PHY block with the CRC-failed PHY header as well to the packet synthesizing unit 237, it is desirable that the data receiver 20 also includes an additional unit that can estimate the cause of the CRC failure and determines whether to pass the CRC-failed PHY block to the packet synthesizing unit 237 based on the result of the estimation, when the retransmission counter indicates zero and not all of the PHY block data is present.

In the case shown in FIG. 5 or FIG. 6, a CRC-failed PHY block is sometimes located on a boundary of two MAC packets. If the numbers of the PHY packets in the two MAC packets transmitted at the time are known, it is possible to estimate which of the MAC packets the CRC-failed PHY packet belongs to.

Returning to the explanation of FIGS. 3 and 4, the MAC 24 includes a deinterleaver 241, a packet-error correction decoder 242, and a packet-CRC checking unit 243.

The deinterleaver 241 deinterleaves the MAC packet synthesized by the packet synthesizing unit 237, and outputs the deinterleaved MAC packet to the packet-error correction decoder 242.

The packet-error correction decoder 242 performs the error-correction decoding on the deinterleaved MAC packet based on the first error-correction coding method, and outputs the corrected MAC packet to the packet-CRC checking unit 243.

The packet-CRC checking unit 243 performs the CRC check on the entire MAC packet based on the CRC added to the MAC packet. If the MAC packet passes the CRC check, the packet-CRC checking unit 243 removes the packet CRC and the packet header and transmits the MAC packet to an external device (not shown) in the form of a packet payload. If the MAC packet fails the CRC check, another process such as the retransmission in the MAC layer is performed depending on the content of the packet. However, detailed procedure of the MAC layer retransmission is not related to the first embodiment, and therefore the explanation thereof is omitted.

The retransmission in units of PHY block according to the first embodiment does not guarantee reproduction of all the data; the purpose of the retransmission is to correct data which have extremely bursty errors caused by the stoppage of the transmitter and the like. Therefore, errors can occur after the CRC check on the MAC packet, and errors due to different causes can be corrected by checking errors in units of MAC packet.

The reception memory 25 includes a recording medium including a semiconductor memory, and stores therein various data on received PHY blocks and various data on PHY blocks to be retransmitted. The reception memory 25 includes one of a magnetic recording medium, an optical recording medium, and a non-volatile recording medium including a semiconductor memory, and stores therein programs required to operate the data receiver 20 and data used to execute the programs.

The transmitting radio unit 26 is a wireless transmitter compliant with a predetermined radio method. The transmitting radio unit 14 converts input PHY blocks into an appropriate form of radio signals and transmits the converted PHY blocks to the data transmitter 10 via the transmission antenna 27.

Figure 7:
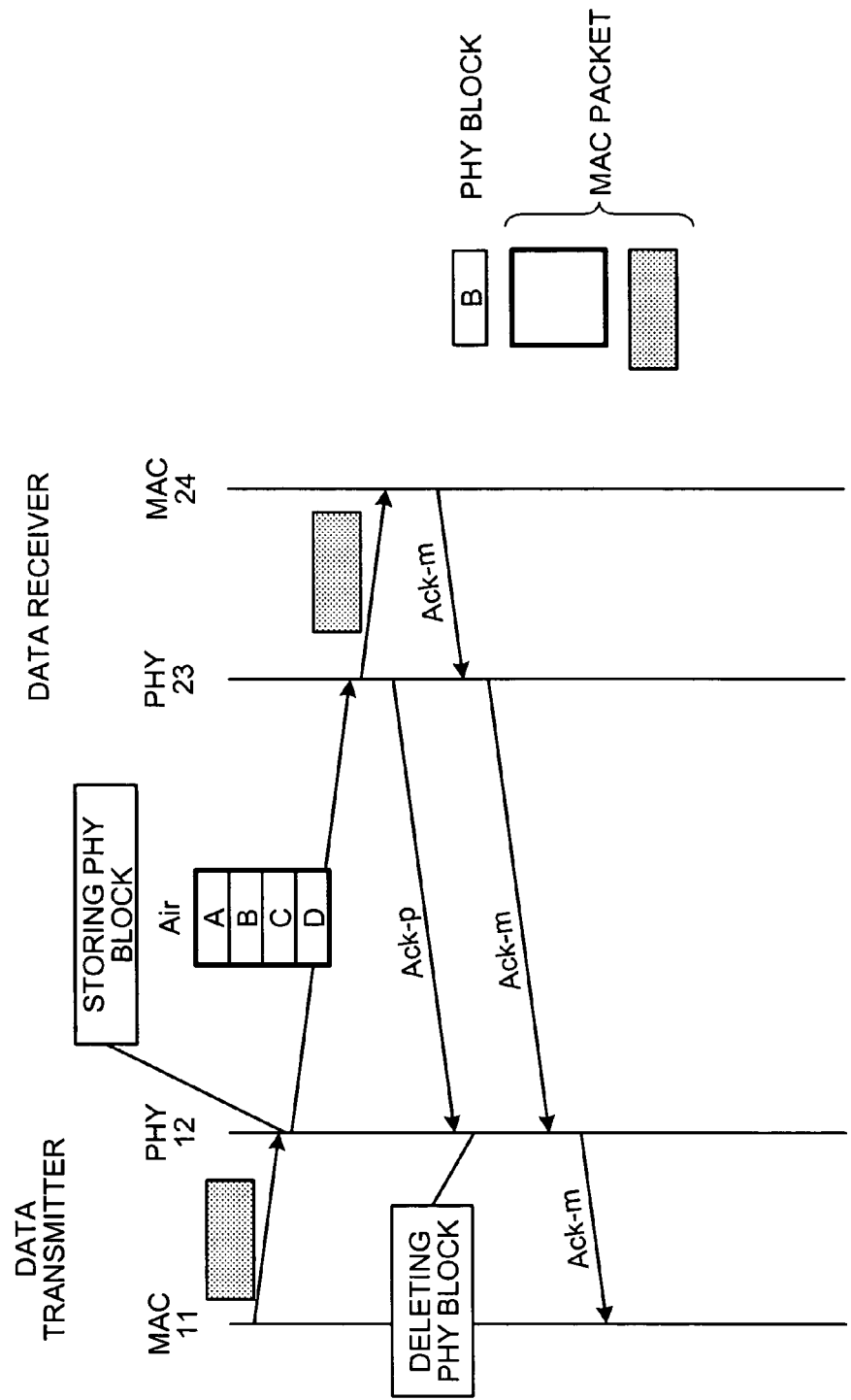
FIGS. 7 and 8 are schematic views of operations in a data communication system according to the first embodiment.
Figure 8:
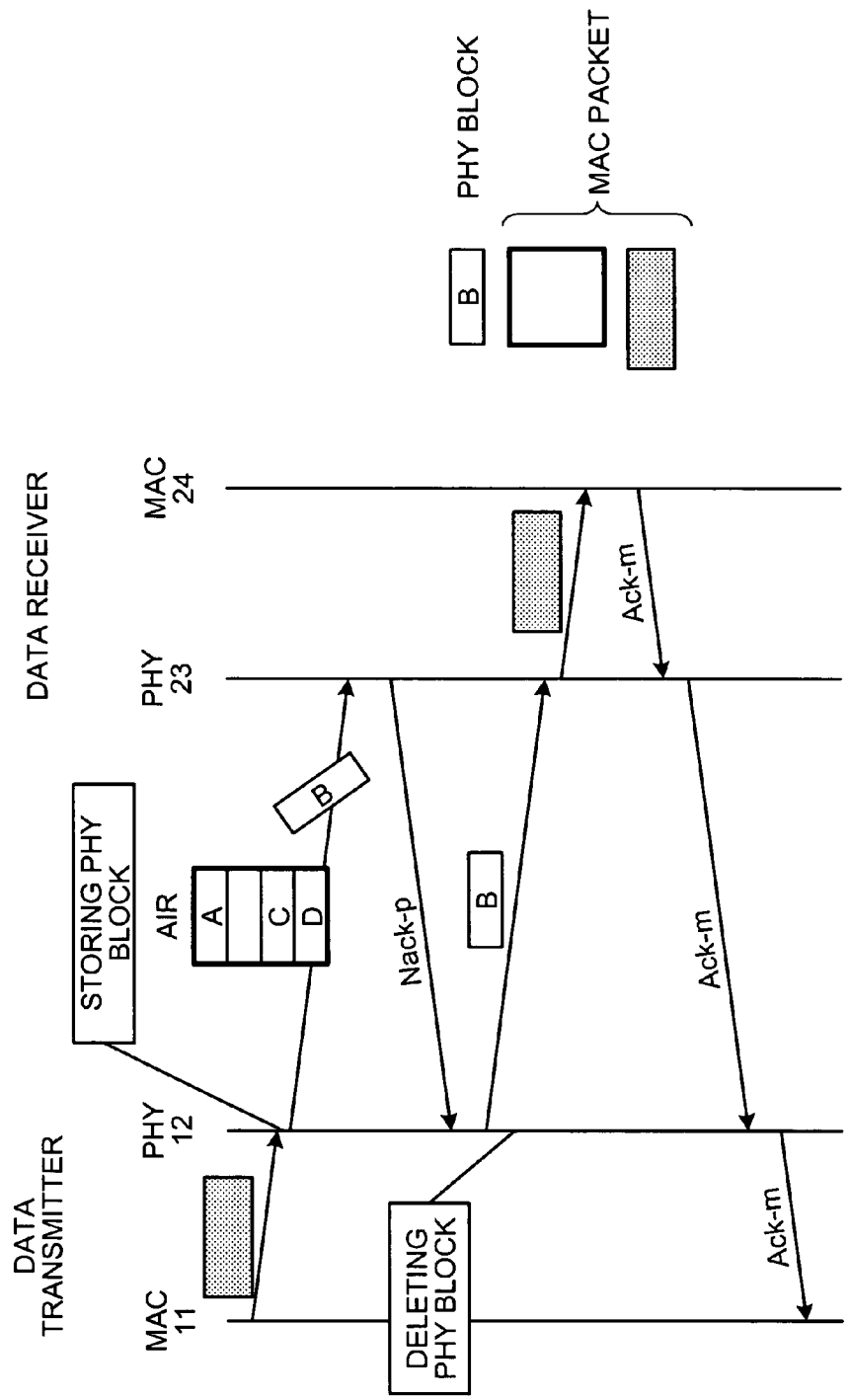

Next, actions of the data transmitter 10 and the data receiver 20 are explained using FIG. 7 and FIG. 8. FIG. 7 is a schematic view of a flow of data exchanged between the data transmitter 10 and the data receiver 20. FIG. 8 is a schematic view of the data exchanged between the data transmitter 10 and the data receiver 20 at the time of the retransmission.

As shown in FIG. 7, after a MAC packet is output from the MAC 11 to the PHY 12 and subjected to an appropriate process in the data transmitter 10, a plurality of PHY blocks in the MAC packet are transmitted to the data receiver 20 in the form of radio signal. It is shown in FIG. 7 that PHY blocks A to D are transmitted. As described above, in the data transmitter 10, the PHY blocks to be transmitted (for example, the PHY blocks A to D) are stored in the transmission memory 13 for retransmission unless the retransmission counter of the transmitted PHY block indicates zero.

When the data receiver 20 receives the radio signal from the data transmitter 10, it is determined whether a group of the PHY blocks that belong to the identical MAC packet have been correctly received, i.e., whether all of the PHY headers have passed the CRC check, based on the above-described procedure. If the PHY blocks have been correctly received, the packet synthesizing unit 237 in the PHY 23 outputs a synthesized MAC packet to the MAC 24.

If the retransmission counter of the PHY blocks composing the synthesized MAC packet is not zero, the retransmission processing unit 236 generates an Ack-p, which is an Ack for the PHY 12 in the data transmitter 10, and transmits it to the data transmitter 10. It is assumed herein that the Ack-p includes the packet ID of the synthesized MAC packet, i.e., the packet ID of the MAC packet received from the data transmitter 10. If the retransmission counter indicates zero when the MAC packet synthesized by the PHY 23 is output to the MAC 24, it means that the retransmission process in units of PHY block has been terminated, and therefore the Ack-p is not transmitted to the data transmitter 10. According to the first embodiment, Acks and Nacks are returned in units of MAC packet. In other words, if a single transmission of a single MAC packet includes a plurality of PHY blocks, an Ack or a Nack including all of the acknowledgement informations of those PHY blocks is returned at a time, whereby reducing the amount of Acks and Nakcs.

In the data transmitter 10, upon receiving the Ack-p from the data receiver 20, the retransmission control unit 125 analyzes the Ack-p received by the receiving radio unit 17, and deletes data on the PHY blocks corresponding to the packet ID included in the Ack-p from the transmission memory 13.

If the synthesized MAC packet passes the packet-CRC check, the packet-CRC checking unit 243 in the data receiver 20 generates an Ack-m, which is an Ack for the MAC packet, and transmits the Ack-m to the MAC 11 in the data transmitter 10 via the transmitting radio unit 26.

When the data transmitter 10 receives the Ack-m, the Ack-m is output to the MAC 11. Although the Ack-p and the Ack-m are returned to the data transmitter 10 separately in the first embodiment, the Ack-p can be piggybacked on the Ack-m. Transmission of the Ack-m and the Ack-p in the piggyback method is realized by the following configuration.

When the Ack-m is generated, the MAC 24 in the data receiver 20 notifies the PHY 23 which packet ID of MAC packet the Ack corresponds to. For example, the packet-CRC checking unit 243 refers to the packet ID notified of along with the synthesized MAC packet from the packet synthesizing unit 237, and outputs the packet ID to the retransmission processing unit 236.

The retransmission processing unit 236 compares the notified packet ID with the packet ID in the Ack to be transmitted to the PHY 12, i.e., the packet ID in the PHY block data stored in the reception memory 25. If the retransmission processing unit 236 determines that they match, it piggybacks information corresponding to the Ack-p on the PHY header when it generates the PHY block for transmitting the Ack-m. In other words, the retransmission processing unit 236 writes in the header of the identical PHY block that the Ack is for the PHY 12 in the data transmitter 10 and the packet ID corresponding to the Ack. Such a mode can be realized by making the length of the PHY header variable and using an option field. If the PHY headers are thinned out as described later, the information can be inserted into the thinned PHY headers.

However, the Ack-m transmitted from the MAC 24 to the MAC 11 generally has a short packet length, and the number of PHY blocks is small when the Ack-m is separated into PHY blocks. Therefore, a part of the PHY header can be used as a field that notifies the PHY 12 that it is the Ack for the PHY 12. For example, if the both sizes of the quantity field and the PHY BLK number field are six bits, and if the Ack-m can be composed of eight PHY blocks, three bits is actually enough for these fields. In such a case, the quantity field clarifies that the MAC packet (Ack-m) is composed of eight PHY blocks, the PHY block number is written in the last three bits of the PHY BLK number field, and a flag indicating that the PHY header includes an Ack from the PHY 23 to the PHY 12 is written in the first three bits.

If the maximum number of the PHY blocks is very large and the maximum number of the packet ID is not large compared with the maximum number of the PHY blocks, the packet ID can be included in the PHY BLK number field. For example, the number of bits which is actually necessary the quantity field to transmit an Ack-m is subtracted from the bit length of the PHY BLK number field, and the remaining part of the PHY BLK number field can be used for the packet ID.

If the retransmission counter indicates zero, the piggybacked Ack is not returned to the data transmitter 10 even if it was the first transmission, like the Ack-p. This is because the data transmitter 10 has completed the process on the corresponding PHY blocks due to the zero-indicating retransmission counter, and the data on the PHY blocks are not stored in the transmission memory 13. Moreover, because the data receiver 20 immediately synthesizes a MAC packet from a group of PHY blocks in which the retransmission counter indicates zero regardless of the result of the CRC check, the process on the PHY blocks has been completed. In other words, both the PHY 12 and the PHY 23 have completed the process on the PHY blocks, and the Ack would not help at all even if it was transmitted to the data transmitter 10.

There is-a case that the entire MAC packet does not pass the packet-CRC check even if all of the PHY headers pass the CRC check. In such a case, a retransmission is performed independently in the MAC 24 in the MAC layer if the retransmission is performed, and the PHY 23 can presume that the reception process of the corresponding PHY blocks has been completed. Because the entire MAC packet failed the CRC check, the MAC 24 in the data receiver 20 notifies the PHY 23 of the packet ID of the CRC-failed MAC packet even when a Nack-m is transmitted instead of the Ack-m. The PHY 23 receives the packet ID. If the packet ID that the corresponding Ack should be transmitted is stored in the reception memory 25, the PHY 23 piggybacks the packet ID and transmits them to the data transmitter 10. At this time, the PHY 23 transmits the Ack-p to the PHY 12 instead of the Nack-P.

There can be an exceptional process that the MAC 24 returns neither a Nack nor an Ack. The MAC 24 can be configured to notify the PHY 23 of the fact along with the packet ID. When the PHY 23 is notified of the fact, if an Ack on the PHY blocks of the received packet ID should be returned to the PHY 12 in the data transmitter 10, the PHY 23 generates an Ack-p independent of generation of Ack-m and transmits it to the PHY 12.

A retransmitting operation performed between the data transmitter 10 and the data receiver 20 is explained below referring to FIG. 8. The same operations as shown in FIG. 7 are omitted from the explanation.

In FIG. 8, PHY block B fails CRC-check when PHY blocks A to D are transmitted from the data transmitter 10 to the data receiver 20, and it was the first transmission. In such a case, the retransmission processing unit 236 in the data receiver 20 generates a Nack-p, i.e., retransmission requesting information, that instructs retransmission of the PHY block B, and transmits it to the PHY 12 in the data transmitter 10.

The retransmission control unit 125 in the data transmitter 10 receives the Nack-p from the data receiver 20, and retransmits PHY block B requested by the Nack-p. At this time, the value of the retransmission counter for the PHY block B, which was one, is decremented to zero. At the same time, because PHY blocks corresponding to the identical MAC packet is not to be retransmitted anymore, the retransmission control unit 125 deletes data on the packet ID of the MAC packet from the transmission memory.

When the PHY header of the PHY block B retransmitted to the data receiver 20 passes the CRC check performed by the CRC checking unit 234, the packet synthesizing unit 237 synthesizes a packet from the PHY block and other PHY blocks belong to the same MAC packet in the reception memory 25, and outputs the synthesized MAC packet to the MAC 24. If the retransmission counter of the PHY block B indicates zero, the retransmission processing unit 236 determines that the process on the MAC packet including the PHY block B has completed, and it generates neither an Ack nor a Nack. The retransmission processing unit 236 deletes the data on the MAC packet.

Upon receiving the MAC packet from the packet synthesizing unit 237 in the PHY 23, the packet-CRC checking unit 243 in the MAC 24 generates one of an Ack-m and a Nack-m based on the synthesized MAC packet, and transmits it to the MAC 11 in the data transmitter 10.

Figure 9:
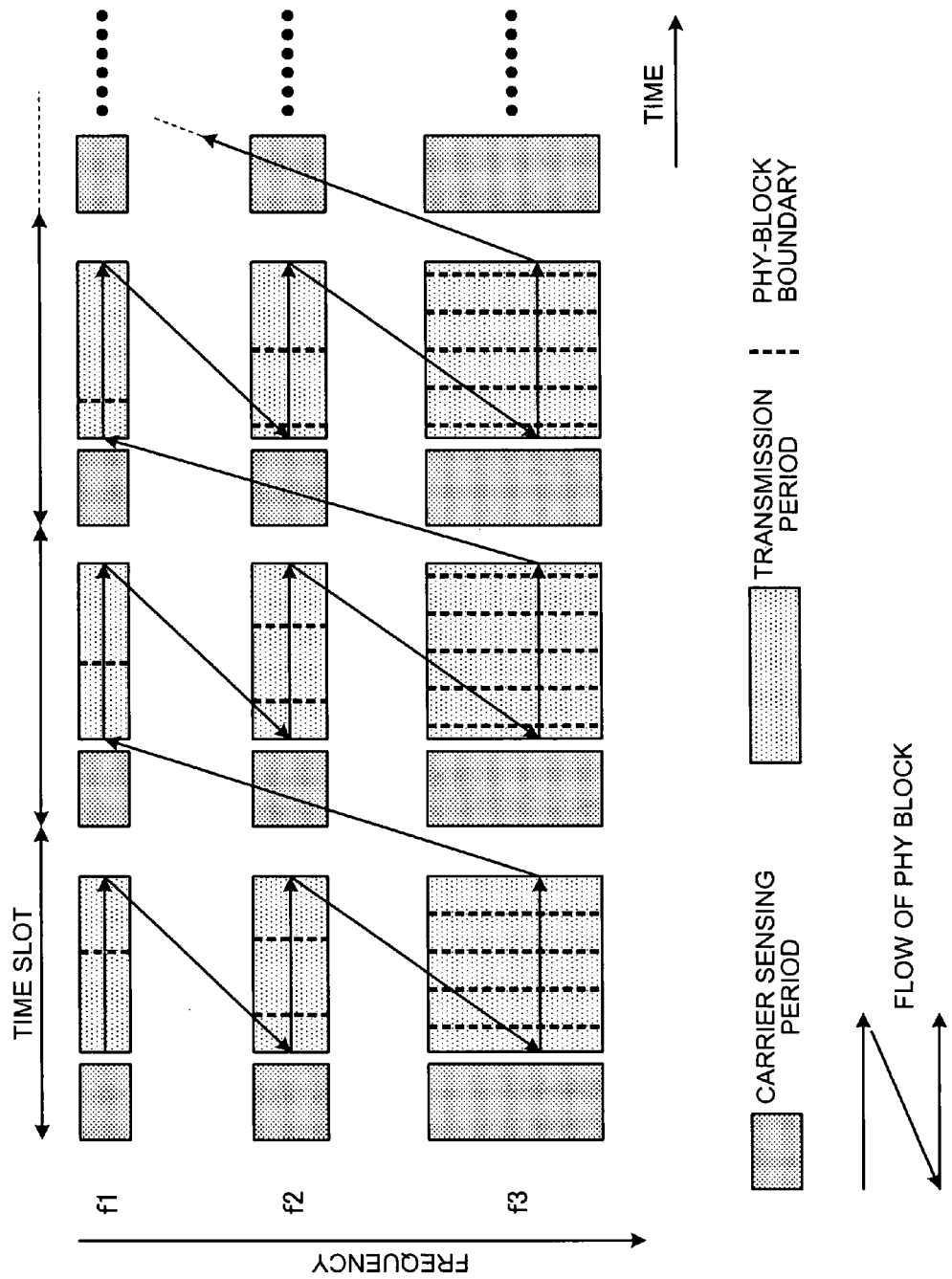
FIG. 9 is a schematic view showing an example of a utilizing configuration of the data communication system.

Next, an example of use of frequency by the data communication system is explained referring to FIG. 9. In FIG. 9, the horizontal axis indicates time; the vertical axis indicates frequency; and each rectangle indicates the frequency and the time used and occupied by the data transmitter 10 and the data receiver 20.

The data transmitter 10 according to the first embodiment uses, for example, three different frequency bands centered on frequencies f1, f2, and f3. Time is divided into time slots. Each of the time slots has a carrier sensing period and a transmission period separated by short guard intervals. The data transmitter 10 according to the first embodiment is configured to use the three frequency bands at a time.

The flow of PHY blocks transmitted from the data transmitter 10 is indicated by the arrows shown in FIG. 9, and each PHY block is separated at a dotted line. The time length of the PHY blocks differ depending on the frequency bands because the time required to transmit the same bit length of the PHY block differs due to the different bandwidth depending on the frequency bands. It is assumed herein that the PHY blocks are transmitted in parallel in a plurality of frequency bands.

If transmission from a licensed terminal or an unacceptable level of the interference wave is detected in any one of the frequency bands during the carrier sensing period, the data transmitter 10 stops the transmission during the following transmission period in the frequency band. As a result, different numbers of PHY blocks are not transmitted depending on the frequency bandwidths. If the transmission stops in such a state, not all of the following communication stops. Instead, only the PHY blocks that should have been transmitted in the time slot and the frequency band in which the transmission stopped are not transmitted.

In the frequency band where the transmission stopped, whether the transmission resumes after the stoppage, another frequency band is used, or the communication is continued in the reduced frequency bands, depends on the system design. However, though the communication speed may reduce, such an event that the PHY blocks are dropped due to a sudden transmission stoppage can be at least limited to a single time slot in the frequency band where the problem occurred. Moreover, in the mode shown in FIG. 9, even if the transmission suddenly stops, only a part of the PHY blocks of a single MAC packet is not transmitted or received.

Furthermore, in the mode shown in FIG. 9, if the bandwidth of each frequency band has a certain width and the bandwidth of all the frequency bands to be used is sufficiently wide, frequency-selective fading is performed in most cases. Therefore, by lowering the first coding rate and performing the interleaving in a sufficient length, the error due to the frequency-selective fading is correctably dispersed and averaged, resulting in very few burst errors due to the fading.

In such a mode, the error correction by the first error-correction coding and the interleaving is highly effective, and an error can occur only if unexpected burst errors occur in such a case as the transmission stoppage. Therefore, the retransmission control method according to the first embodiment is especially effective to correct the burst errors due to the transmission stoppage occurred in the frequency usage such as FIG. 9.

As described above, errors due to the fading can be corrected by the error-correction coding performed by the first encoder 112 and the interleaver 113. By allowing a certain margin of the coding rate, errors in receiving PHY blocks caused by the burst error due to the transmission stoppage can be corrected if not many errors are caused by the fading or the like. Therefore, the retransmission-count checking unit 235 can be configured to determine the ratio of the CRC-failed PHY blocks when receiving the PHY blocks for a single MAC packet, and to pass the process over to the packet synthesizing unit 237 depending on the ratio. For example, if the ratio of the CRC-failed PHY blocks is within a predetermined value, the retransmission-count checking unit 235 does not perform the process for retransmission even if a CRC-failed PHY block exists and the retransmission counter indicates one or more, and passes the process to the packet synthesizing unit 237 to synthesize the MAC packet. The ratio used as an index of the determination is variable depending on the system environment.

For example, an acceptable ratio differs between the case when a propagation path is ideal and a reception carrier-to-noise ratio (reception CNR) is very good and a case when a propagation loss and the fading are large. The ratio can be determined by, for example, uniquely predetermining an average propagation loss and an average state of the fading and abating the ratio based on them. In other words, erroneous PHY blocks can be accepted at the ratio corresponding to decibel count which is equal to a difference between an expected value of Eb/N0 in an average propagation path and the Eb/N0 that specifies the desired bit error rate based on the first error-correction coding. Moreover, if the value of the Eb/N0 can be roughly estimated from the received power or the like, the erroneous PHY blocks can be accepted at the ratio corresponding to decibel count which is equal to a difference between the estimated value and the Eb/N0 that specifies the desired bit error rate based on the first error-correction coding.

According to the first embodiment, the first error-correction coding method, the second error-correction coding method, the first coding rate, and the second coding rate are variable depending on the system environment. Details of the first error-correction coding method, the second error-correction coding method, the first coding rate, and the second coding rate are described below.

As described above, the first error-correction coding is performed on a MAC packet, which includes more bits than a PHY block, and the MAC packet is then interleaved. On the other hand, the bit length of a PHY header which is to be subjected to the second error-correction coding is much shorter than the length of an entire PHY block. According to the first embodiment, PHY headers are not interleaved. This is because a single PHY header needs to be closed in itself, and an effect of interleaving the PHY header is very small due to the very small number of bits. The size of a PHY header is only tens of bits, whereas that of a MAC packet is ten to hundreds of times larger. Therefore, the packet error rates of MAC packets and PHY headers differ proportional to the difference in their bit numbers.

The retransmission can be performed due to the fading or the like in general wireless communication systems. However, according to the first embodiment, they are assumed that the retransmission due to the fading is not frequently performed thanks to the first error-correction coding, the interleaving, and the frequency allocation effectively affected by the interleaving, and that the retransmission is generally caused by burst errors due to a transmission stoppage or the like.

When the transmission stops in a data transmitter, one of noise and interference wave is input to a data receiver as a signal. If the data receiver demodulates the noise or the interference wave, a meaningless bit string is output, and it is very unlikely that the PHY header passes the CRC check. When it is desirable that CRC check failures occur only at a case of transmission stoppage, the second error-correction coding should be stronger than the first error-correction coding considering that the bit error rate of PHY headers due to fading is higher for not being interleaved. Although errors of data itself due to fading or the like can be almost corrected by the first error-correction coding and interleaving, PHY headers also need to have no CRC-failure due to fading without interleaving. In other words, if a first error-correcting encoder and a second error-correcting encoder use the same error-correcting codes, the coding rate of the PHY header should be reduced. Even if such a strong error-correction coding is performed as described above, it is very unlikely that a PHY header passes the CRC check when only noise is input. Therefore, it is possible to almost perfectly detect the error due to the transmission stoppage, and errors due to the fading can be reduced at the same time.

On the other hand, in a system in which errors due to fading are not sufficiently corrected by the first error-correction coding and the interleaving but corrected only by retransmission, an error-correcting ability of PHY headers can be reduced to reduce retransmission amount in the MAC layer or upper layers. If a PHY block includes a PHY header that failed the CRC check due to fading, it is very likely that the PHY block data is also deteriorated by fading. If the deteriorated data is retransmitted, the part that caused errors in the MAC packet can be retransmitted selectively. In this manner, because the pinpoint retransmission in units of PHY block can be performed, the retransmission amount can be reduced, and the error rate of MAC packets can be reduced. However, if the error correction performed on MAC packets is sufficient, errors or retransmissions of MAC packets due to fading almost never occur, and the retransmission in units of PHY block is useless.

From the views described above, the most preferable mode is that the first error-correction coding and the second error-correction coding have equal error-correcting ability. In other words, when a MAC packet is subjected to a sufficient error correction, the interleaving is very effective in the mode shown in FIG. 9, where most of errors due to fading are corrected by the very strong averaging characteristic. If it is the case, by applying sufficiently strong error-correction to PHY headers and retransmitting PHY blocks corresponding to only extreme burst errors due to the transmission stoppage, unnecessary retransmission can be prevented. On the other hand, if the error correction performed on MAC packets is not strong enough, fading can cause errors in units of MAC packet. If it is the case, by reducing the error correction ability on PHY headers, the deteriorated PHY header that caused errors in the MAC packet can be identified and retransmitted.

The second error-correction coding can be very strong regardless of the strength of the first error-correction coding, by applying a design concept that retransmission in units of PHY block is limited to failure of the reception due to transmission stoppages. Alternatively, to reduce retransmissions in units of MAC packet, the error correction on PHY headers can be very weak and most of retransmission can be performed in units of PHY block. In the latter case, because a PHY header is unlikely to generate a packet error due to its small size, a weaker code can be used so that a CRC error in a PHY header is easily detected.

The equal error-correcting ability mentioned above does not mean only the same code and the same coding rate; it means a state in which the ability of correcting errors is equal including the performance of interleaving. Therefore, if the same error-correcting code is used, the second coding rate in the second error-correction coding performed on PHY headers needs to be reduced to acquire the equal error-correcting ability. According to the first embodiment, although the size of a PHY header is almost fixed, the size of a MAC packet is variable. It is desirable to determine the effect of interleaving using an average size of MAC packets. Apart from the MAC packets, because the error-correcting ability changes depending on evaluation conditions, the error-correcting ability can be determined under each average environment corresponding to various operating conditions of the system.

For example, there is a system that selects a code and coding rate used in the first error-correction coding depending on the state of loss in the propagation path. In such a case, it is desirable to select a code and a coding rate used in the second error-correction coding corresponding to the selected first error-correcting code and rate. There are various error-correcting codes. If the bit size of information that error-correction coding is applied to is small and the information can be seen as a single block with a small bit number like a PHY header, a block code such as Reed-Solomon code is used; if the bit size is large such as a MAC packet, a convolutional code and turbo decoding is used.

As described above, according to the first embodiment, by generating a PHY block by associating its identification information and the data for detection of errors in the identification information with each PHY block data, and by storing the PHY block in the transmission memory 13 for retransmission, an errored PHY block can be effectively detected, and a retransmission of the block can be performed immediately upon request. As a result, retransmission of PHY blocks that belong to a single MAC packet can be effectively performed.

Moreover, by performing the error-correction coding on PHY block headers apart from the error-correction coding on an entire packet with the error-correcting ability close to that of the error-correction coding on an entire packet, and by configuring a PHY block header so that errors can be detected, a slight error due to fading in PHY block headers can be corrected, and a PHY block that includes burst errors can be distinguished and retransmitted. As a result, the amount of retransmissions can be reduced.

Furthermore, if a communication failure such as transmission stoppages suddenly occurs, burst errors due to the transmission stoppage can be corrected within the allowable retransmission performing times specified by the retransmission counter, and therefore delay due to retransmissions in the physical layer where the nature of the packets is not recognized are reduced. As a result, the transmission efficiency is improved.

As described above, PHY headers in a plurality of PHY blocks belonging to a single MAC packet include common information such as the packet ID, the quantity, and the retransmission counter. This mechanism is necessary because when a PHY block is uncorrectly received, the data receiver can estimate the identification information about the uncorrect PHY block from the adjacent PHY blocks. However, if CRC errors do not easily occur, if successive two CRC-failed PHY blocks are seldom received, or if a plurality of PHY blocks seldom fail the CRC check during transmission of the PHY blocks belonging to a single MAC packet, for example, the PHY header or common information can be added every predetermined number of the PHY block data. In this case, it is necessary to establish a rule in advance so that the data receiver can find out which PHY block includes the common information in its PHY header, and to share the rule between the data transmitter and the data receiver.

A data communication system according to a second embodiment of the present invention is explained below. The data communication system according to the second embodiment includes a data transmitter 30 and a data receiver 40. Constituent elements common with the data communication system according to the first embodiment are denoted with the same numerals, and the explanation thereof is omitted.

Figure 10:
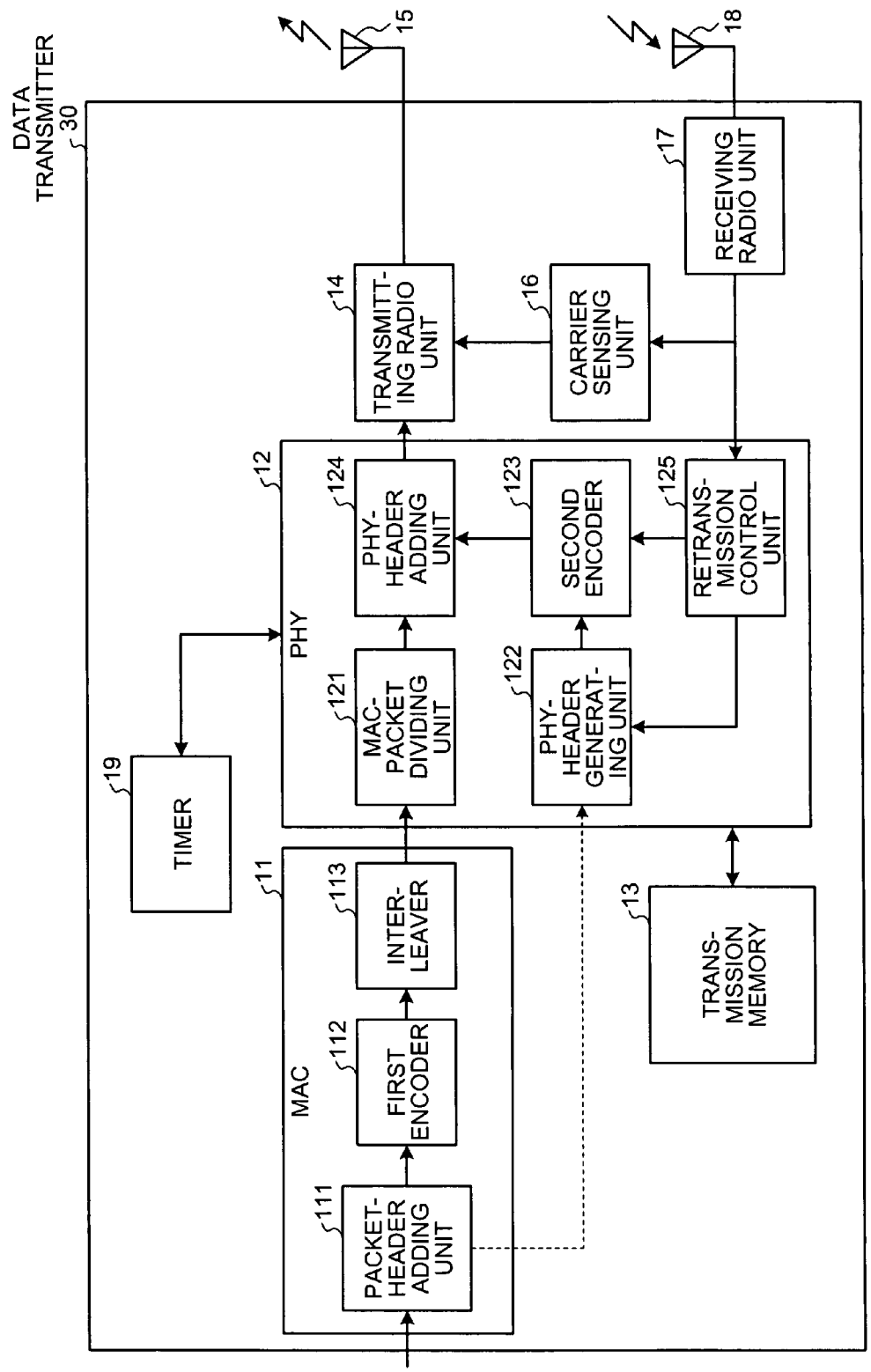
FIG. 10 is a block diagram of a data transmitter according to second embodiment of the present invention.

As shown in FIG. 10, the data transmitter 30 includes a timer 19 that measures time in addition to the configuration of the data transmitter 10 shown in FIG. 1.

The retransmission control unit 125 according to the second embodiment starts counting as soon as the PHY-header adding unit 124 outputs a PHY block, and determines whether a predetermined time has passed, based on the time measured by the timer 19. The retransmission control unit 125 clears the count upon receiving one of an Ack-p and a Nack-p from the data receiver 40.

Figure 11:
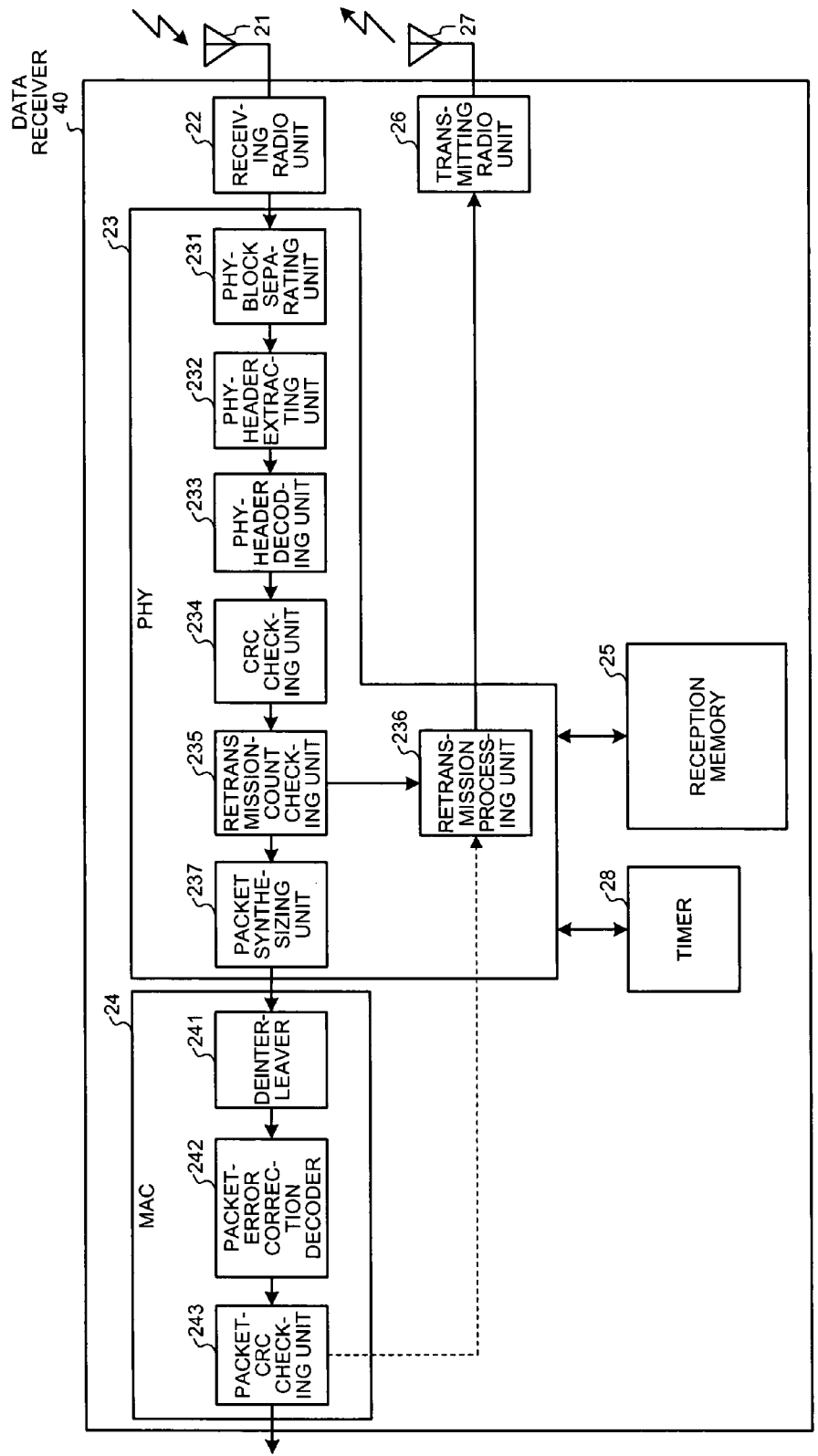
FIG. 11 is a block diagram of a data receiver according to the second embodiment.

As shown in FIG. 11, the data receiver 40 includes a timer 28 that measures time in addition to the configuration of the data receiver 20 shown in FIG. 3.

The retransmission-count checking unit 235 starts counting upon outputting the information on a PHY block to be retransmitted to the retransmission processing unit 236, and determines whether a predetermined time has passed, based on the time measured by the timer 28. The retransmission-count checking unit 235 clears the count as soon as the PHY block retransmitted from the data transmitter 30 is input.

Figure 12:
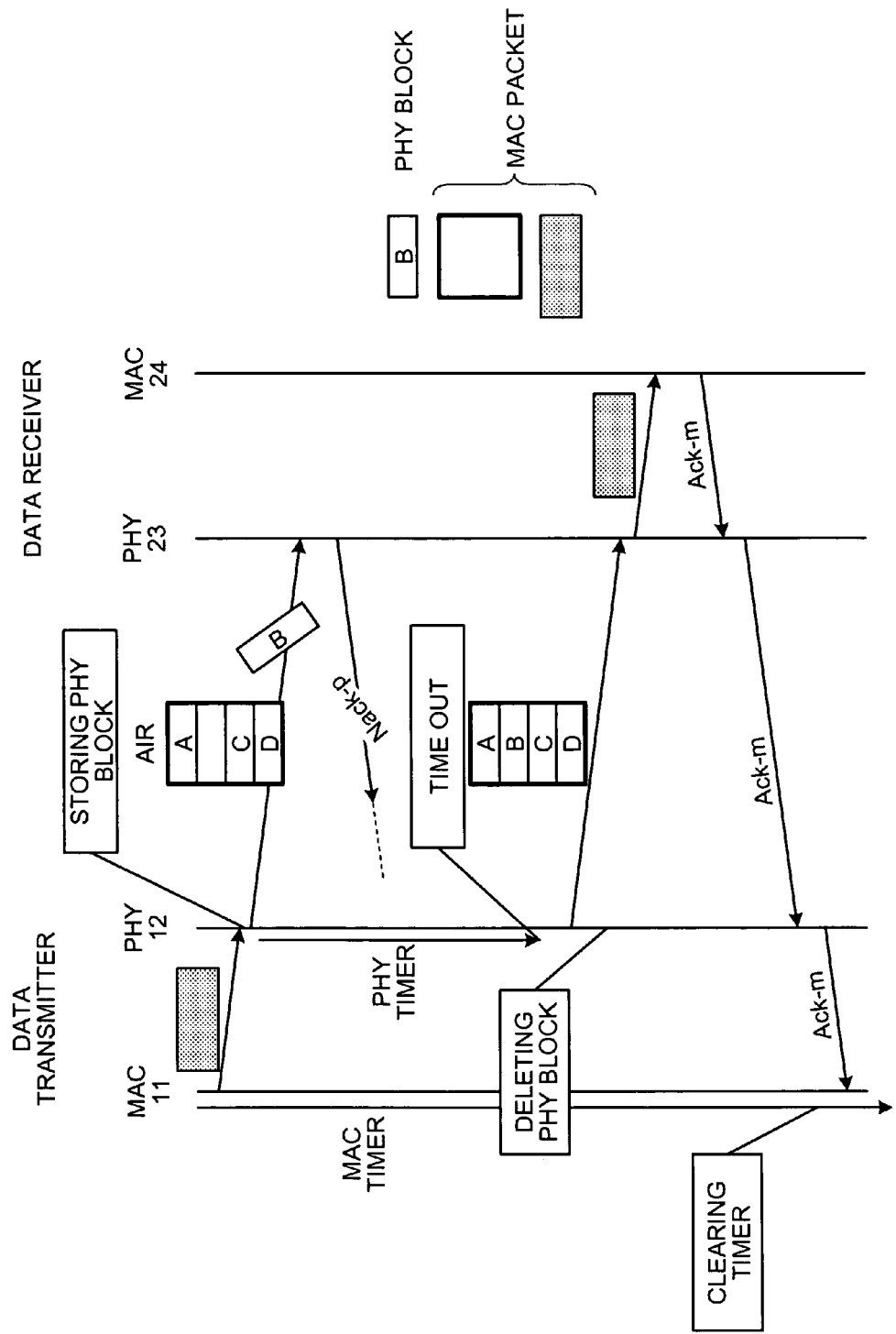
FIGS. 12 and 13 are schematic views of operations in a data communication system according to the second embodiment.

In the following, actions performed by the data transmitter 30 and the data receiver 40 are explained using FIG. 12 and FIG. 13. FIG. 12 is a schematic view of data exchanged between the data transmitter 30 and the data receiver 40.

The MAC 11 in the data transmitter 30 starts a MAC timer as soon as the MAC packet is input from the MAC 11 to the PHY 12, and counts time until a predetermined MAC time limit. Hereinafter, the time counted by the packet-header adding unit 111 in the MAC 11 is referred to as a MAC timer. The retransmission control unit 125 then counts time until a predetermined PHY time limit. Hereinafter, the time counted by the retransmission control unit 125 is referred to as a PHY timer.

If the CRC checking unit 234 determines that the PHY header in PHY block B failed the CRC check when PHY blocks A to D were transmitted from the data receiver 40, the retransmission processing unit 236 in the PHY 23 generates a Nack-p that instructs retransmission of PHY block B, and transmits it to the PHY 12 in the data transmitter 30.

Upon receiving the Nack-p from the data receiver 40, the retransmission control unit 125 in the data transmitter 30 clears the PHY timer, and performs a retransmission process on the PHY block corresponding to the Nack-p. If the retransmission control unit 125 does not receive the Nack-p within the PHY time limit as shown in FIG. 12, the retransmission control unit 125 instructs the data transmitter 30 to retransmit all of PHY blocks A to D in the transmission memory 13. At this time, the retransmission control unit 125 decrements the value of the retransmission counter in PHY blocks A to D by one. If the decremented value is zero, data related to PHY blocks A to D are deleted from the transmission memory 13.

On the other hand, upon receiving the retransmitted PHY blocks A to D, the PHY 23 in the data receiver 40 synthesizes a MAC packet from the retransmitted PHY blocks A to D and other PHY blocks in the reception memory 25, and outputs the synthesized MAC packet to the MAC 24. If the retransmission counter in the retransmitted PHY blocks A to D indicate zero, the retransmission processing unit 236 in the PHY 23 transmits neither an Ack-p nor a Nack-p, and deletes the data on the synthesized MAC packet from the reception memory 25.

The packet-CRC checking unit 243 in the MAC 24 generates an Ack-m based on the synthesized MAC packet, and transmits the Ack-m to the MAC 11 in the data transmitter 30.

Upon receiving the Ack-m from the data receiver 40, the MAC 11 in the data transmitter 30 clears the MAC timer and determines that the process on the MAC packet has completed.

If the data transmitter 30 does not receive an Ack-m within the MAC time limit, full retransmission of the MAC layer is performed depending on the nature of the MAC packet. Otherwise, an appropriate process such as discarding the packet is performed. According to the second embodiment, it is assumed that the PHY time limit is sufficiently shorter than the MAC time limit.

An operation of a retransmission timer in the data receiver 40 is explained below referring to FIG. 13. In FIG. 13, PHY block B fails the CRC check when PHY blocks A to D were transmitted from the data transmitter 30 to the data receiver 40 for the first time.

In such a case, the retransmission-count checking unit 235 in the PHY 23 instructs the retransmission processing unit 236 to retransmit PHY block B, starts the timer 28 at this timing, and counts time until a predetermined retransmission time limit. Hereinafter, the time counted by the retransmission-count checking unit 235 is referred to as a retransmission timer.

The retransmission control unit 125 in the data transmitter 30 receives a Nack-p from the data receiver 40, and retransmits PHY block B requested by the Nack-p. At this time, the retransmission-count checking unit 235 in the data receiver 40 clears the retransmission timer as soon as the retransmitted PHY block B is input. If the PHY header in PHY block B passes the CRC check, the retransmission control unit 125 passes the process over to the packet synthesizing unit 237, which synthesizes a MAC packet from the PHY blocks in the reception memory 25 and outputs the synthesized MAC packet to the MAC 24.

Figure 13:
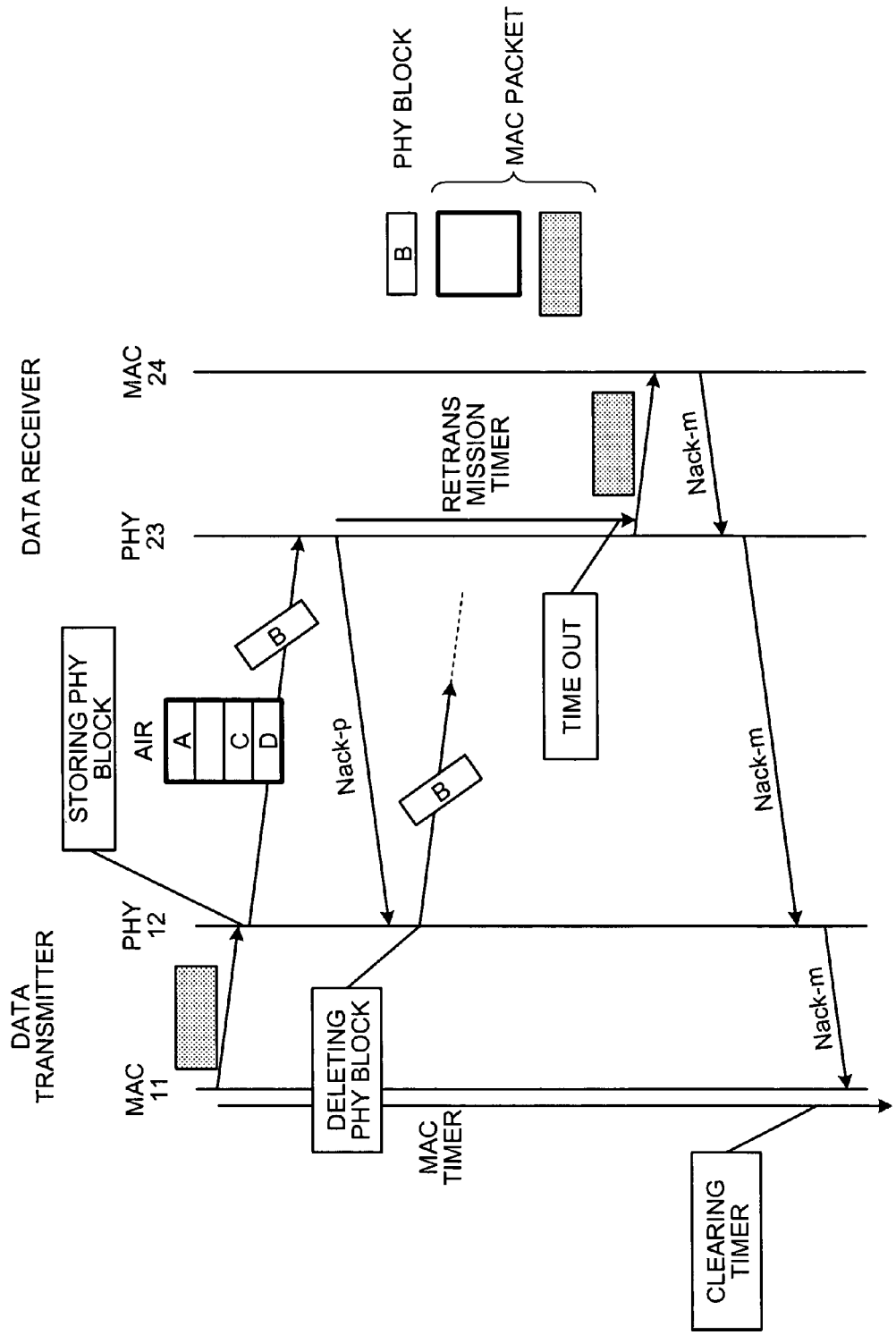

If the retransmitted PHY block is not received within the retransmission time limit as shown in FIG. 13, the retransmission-count checking unit 235 immediately passes the process over to the packet synthesizing unit 237. The packet synthesizing unit 237 synthesizes a MAC packet from the PHY blocks in the reception memory 25 and outputs the synthesized MAC packet to the MAC 24. The synthesized MAC packet can be discarded because it is incomplete; however, it is output to the MAC 24 according to the second embodiment because it can be corrected by de-interleaving and error correction performed on the MAC packet.

The packet-CRC checking unit 243 in the MAC 24 checks the CRC in the synthesized MAC packet, and transmits one of an Ack-m and a Nack-m to the MAC 11 in the data transmitter 30 depending on the result of the CRC check. In FIG. 13, a Nack-m is transmitted. Upon receiving the Nack-m, the MAC 11 clears the MAC timer.

The retransmission time limit needs to be slightly longer than the PHY time limit. Otherwise, the retransmission time limit is over before the PHY time limit, i.e., the PHY 23 outputs an incomplete MAC packet to the MAC 24 before the retransmitted PHY block is received. Therefore, the MAC time limit needs to be longer than the retransmission time limit.

As described above, according to the second embodiment, by generating a PHY block by associating its identification information and the data for detection of errors in the identification information with each PHY block data, and by storing the PHY block in the transmission memory 13 for retransmission, an errored PHY block can be effectively detected, and the retransmission of the block can be performed immediately upon request. As a result, retransmission of PHY blocks that belong to a single packet can be effectively performed. Moreover, by controlling retransmission of PHY blocks based on the predetermined time limit, delay due to the retransmission can be within the predetermined time.

The data transmitter 30 according to the second embodiment retransmits a PHY block only when the retransmission counter does not indicate zero and a retransmission requesting information is received from the data receiver 40 and when the retransmission counter does not indicate zero and the PHY time limit is over; however, the present invention is not limited to the second embodiment. For example, if the data transmitter 30 stops the transmission, the data transmitter 30 recognizes that the PHY blocks involved in the transmission stoppage are not received by the data receiver 40. Therefore, the data transmitter 30 can be configured to automatically retransmit the PHY blocks that were not transmitted before receiving a retransmission requesting information from the data receiver 40. More specifically, this mode can be realized according to the following procedure.

Upon detecting a PHY block that was not transmitted, the retransmission control unit 125 checks whether the retransmission counter in the PHY block indicates zero. If the retransmission counter indicates one or more, the retransmission control unit 125 decrements the retransmission counter in the PHY header associated with the PHY block by one. The PHY-header adding unit 124 then generates the PHY block to be retransmitted according to the above-described procedure, and the retransmission control unit 125 automatically retransmits the PHY block to the data receiver 40 via the transmitting radio unit 14. If the retransmission counter in the PHY block is zero after the decrement, the PHY-header adding unit 124 deletes the PHY block from the transmission memory 13.

The retransmission counters in all the PHY blocks belonging to an identical MAC packet generally are incremented or decremented simultaneously. However, in the mode of automatic retransmission, values of the retransmission counters varies depending on whether the PHY block was automatically transmitted.

On the other hand, when the data receiver 40 receives a group of PHY blocks in the transmission time when the transmission stoppage occurred, some PHY blocks are missing due to the transmission stoppage. Therefore, if the retransmission counter does not indicate zero, the data receiver 40 generates a Nack-p and transmits it to the data transmitter 30. After the Nack-p is transmitted, the data receiver 40 may receive the PHY blocks automatically retransmitted from the data transmitter 30.

If the data receiver 40 receives the automatically retransmitted PHY blocks, the data receiver 40 determines whether the automatically retransmitted PHY blocks are sufficient for the retransmission request included in the Nack-p. If they are sufficient, the data receiver 40 synthesizes a MAC packet in the same manner as normal retransmission, outputs the synthesized MAC packet, and deletes the information on the MAC packet from the reception memory 25. If they are not sufficient, the data receiver 40 waits for the retransmission time limit even if the retransmission counter indicates zero in consideration of possibility of receiving other retransmitted PHY blocks from the data transmitter 30. The PHY blocks already retransmitted from the data transmitter 30 are subject to an appropriate process in the PHY 23, and stored in the reception memory 25.

The data transmitter 30 receives the Nack-p from the data receiver 40 after the automatic retransmission of the PHY blocks, and it retransmits the PHY blocks requested by the Nack-p. Although the Nack-p includes the block numbers of the PHY blocks automatically retransmitted in advance, these PHY blocks have already been deleted from the transmission memory 13, and then these PHY blocks are not retransmitted. In other words, the data transmitter 30 retransmits only the PHY blocks that are requested by the Nack-p and stored in the transmission memory 13. When the PHY blocks are retransmitted, the values of the retransmission counters are decremented by one. If the decremented value of the retransmission counter is zero, the data transmitter 30 deletes the data on all of the PHY blocks belonging to the identical MAC packet from the transmission memory 13, and terminates the process on the MAC packet.

When the data receiver 40 receives retransmitted PHY blocks from the data transmitter 30 according to the regular procedure of retransmission, the data receiver 40 performs the same process as described in the first embodiment, and, if the retransmission counter indicates zero, it terminates the process on the PHY blocks belonging to the same MAC packet.

The data receiver 40 sometimes receives automatically retransmitted PHY blocks before transmitting a Nack-p. If a Nack-p that reflects the automatically retransmitted PHY blocks can not be regenerated in time, the data receiver 40 transmits the already generated Nack-p to the data transmitter 30, and the retransmission is performed according to the above-described procedure. On the other hand, if the Nack-p can be regenerated in time, the following process is performed.

The Nack-p is regenerated in time because the data receiver 40 recognizes that the automatically retransmitted PHY blocks are received from the data transmitter 30 before transmitting the already generated Nack-p. Because the data receiver 40 receives the retransmitted PHY blocks without outputting a Nack-p, the data receiver 40 clearly recognizes that the PHY blocks were automatically retransmitted.

If the data receiver 40 recognizes that the PHY blocks were automatically retransmitted from the data transmitter 30, it does not transmit the Nack-p at this time. The data receiver 40 then checks whether a single MAC packet can be synthesized from the automatically retransmitted PHY blocks, i.e., whether all of the missing PHY blocks were received, based on the PHY block data in the reception memory 25.

If all of the missing PHY blocks were received, the data receiver 40 passes all of the received PHY blocks to the packet synthesizing unit 237, which synthesizes the MAC packet. The Nack-p is either changed to an Ack-p or piggybacked on the Ack-m from the MAC 24, and transmitted to the data transmitter 30.

If the data receiver 40 determines that the automatically retransmitted PHY blocks are not sufficient to complement the missing PHY blocks, the data receiver 40 generates a Nack-p to request the still missing PHY blocks, and transmits the Nack-p to the data transmitter 30.

The data transmitter 30 automatically retransmits only PHY blocks in which the retransmission counter does not indicate zero, for the following reason. If a PHY block in which the retransmission counter indicates zero is transmitted in the first transmission and the same PHY block is automatically retransmitted, the data receiver 40 processes the PHY block upon receiving it in the first transmission, terminates the process on the MAC packet that the PHY block belongs to, and deletes all the PHY block data belonging to the MAC packet from the reception memory 25. As a result, the retransmitted PHY block is not used at all.

The embodiments of the present invention are not limited to data transmitting apparatus, data receiving apparatus, and data communication system that use wireless communication. The embodiments can be applied to wired communication such as a power-line communication system. In a power-line communication system, modulation signal replaces the radio signal, a modulation-signal generating unit replaces the transmitting radio unit, a received-signal demodulating unit replaces the receiving radio unit, and an interface to a medium such as power-lines replaces the antenna.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transmitting apparatus comprising:
a first encoding unit that encodes a packet to be transmitted based on a first error-correcting method and generates an encoded packet in a media access control layer;
an interleaving unit that interleaves the encoded packet;
a dividing unit that divides the encoded packet output from the interleaving unit and generates a plurality of divided data;
an identification-information generating unit that generates identification information unique to one of the divided data;
a computing unit that computes data for error detection in the identification information;
a second encoding unit that encodes, in a physical layer, the identification information and the data for error detection based on a second error-correcting method using a lower coding rate than a coding rate for the first error-correcting method, performed in the media access control layer, and generates an encoded block header;
a block generating unit that adds the encoded block header to the one of the divided data and generates a block;
a transmission-data storing unit that stores the block;
a carrier sensing unit that performs a carrier sense on a plurality of frequency bands which are concurrently used;
a transmitting unit that transmits the block using the frequency bands and, when the carrier sensing unit detects an interference wave in one of the frequency bands, stops transmission in the one of the frequency bands;
a receiving unit that receives retransmission requesting information for requesting retransmission of the block from a data receiving apparatus, when an error is detected in the block based on the data for error detection; and
a retransmission control unit that reads the block from the transmission-data storing unit and instructs the transmitting unit to transmit the block when the receiving unit receives the retransmission requesting information.

2. The apparatus according to claim 1, wherein
the identification information includes a block number indicating an order of the divided data in the block to form the packet, a quantity information indicating a quantity of all blocks that belong to an identical packet, and a packet identification information for identifying the packet to which the divided data having the identification information belongs, and
the data transmitting apparatus further comprises a transmission control unit that instructs the transmitting unit to collectively transmit blocks that includes identical packet identification information in the order of the block number without including a block belonging to other packet.

3. The apparatus according to claim 2, wherein
the identification information includes a retransmission counter that indicates retransmissible number of times, and
the data transmitting apparatus further comprises:
a storage control unit that determines whether the block including the identification information can be retransmitted based on a value of the retransmission counter included in the identification information and, stores the block in the transmission-data storing unit when the block is determined to be capable of being retransmitted.

4. The apparatus according to claim 3, wherein the identification-information generating unit sets a common value as an initial value of the retransmission counter in a plurality of divided data belonging to an identical packet.

5. The apparatus according to claim 4, wherein
the retransmission control unit decrements the value of the retransmission counter by one every time the block is retransmitted, and
the storage control unit deletes all blocks having a packet identification information identical to that for the block in which the retransmission counter indicates zero from the transmission-data storing unit.

6. The apparatus according to claim 4, wherein the identification-information generating unit sets one of zero and one as the initial value of the retransmission counter.

7. The apparatus according to claim 1, wherein
the identification information includes a retransmission counter that indicates retransmissible number of times, and
the retransmission control unit transmits the block only when the retransmission counter does not indicate zero upon receipt of the retransmission requesting information.

8. A data receiving apparatus comprising: a receiving unit that receives each of a plurality of divided data that form a single encoded packet encoded based on a first error-correcting method in a media access control layer and interleaved on a packet basis and an encoded block header, encoded in a physical layer, including identification information unique to one of the divided data and data for error detection both of which are encoded based on a second error-correcting method using a lower coding rate than a coding rate for the first error-correcting method performed in the MAC layer, on a block basis added to the one of the divided data, from a data transmitting apparatus via a plurality of frequency bands;
a separating unit that separates each of the blocks into the divided data and the encoded block header;
a first decoding unit that performs error-correction decoding on the encoded block header and acquires the identification information and the data for error detection;
an error detecting unit that detects an error in the identification information based on the data for error detection;
a retransmission processing unit that generates requesting information for requesting retransmission of the block that includes the error detected by the error detecting unit in the identification information;
a transmitting unit that transmits the retransmission requesting information to the data transmitting apparatus;
a packet synthesizing unit that synthesizes the encoded packet based on the divided data contained in the block retransmitted from the data transmitting apparatus and other block data received in advance;
a deinterleaving unit that deinterleaves the encoded packet; and
a second decoding unit that performs error-correction decoding on the encoded packet that is deinterleaved by the deinterleaving unit and generates a single packet.

9. The apparatus according to claim 8, wherein
the identification information includes a block number indicating an order of the divided data in the block to form the packet, a quantity information indicating a quantity of all blocks that belong to an identical packet, and a packet identification information for identifying the packet to which the divided data having the identification information belongs,
the packet synthesizing unit arranges the divided data in the order of the block number, and
the retransmission processing unit generates the retransmission requesting information for requesting collective retransmission of all the divided data that are to be retransmitted and include an identical packet identification information.

10. The apparatus according to claim 9, wherein
the identification information includes a retransmission counter that indicates retransmissible number of times for the block, and
the retransmission processing unit determines the divided data in which an error is detected by the error detecting unit and a value of the retransmission counter is one or more to be retransmitted.

11. The apparatus according to claim 10, wherein the packet synthesizing unit synthesizes the encoded packet from all the divided data that are received regardless of a result of an error detection, when a value of the retransmission counter indicates zero in at least one of the divided data having the identical packet identification information.

* * * * *